US012799247B2

(12) United States Patent
DeWilde et al.

(10) Patent No.: US 12,799,247 B2
(45) Date of Patent: Nov. 17, 2026

(54) BIPHENYLPHENOL POLYMERIZATION CATALYSTS HAVING IMPROVED KINETIC INDUCTION TIMES

(71) Applicant: Dow Global Technologies LLC, Midland, MI (US)

(72) Inventors: Joseph F. DeWilde, Midland, MI (US); Ruth Figueroa, Midland, MI (US); Leslie E. O'Leary, Sugar Land, TX (US); Susan Brown, Pearland, TX (US); David M. Pearson, Lake Jackson, TX (US); Jerzy Klosin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 560 days.

(21) Appl. No.: 18/277,322

(22) PCT Filed: Feb. 10, 2022

(86) PCT No.: PCT/US2022/015909

§ 371 (c)(1),
(2) Date: Aug. 15, 2023

(87) PCT Pub. No.: WO2022/173898

PCT Pub. Date: Aug. 18, 2022

(65) Prior Publication Data

US 2024/0052075 A1 Feb. 15, 2024

Related U.S. Application Data

(60) Provisional application No. 63/149,492, filed on Feb. 15, 2021.

(51) Int. Cl.
*C08F 210/16* (2006.01)
*C08F 4/659* (2006.01)

(52) U.S. Cl.
CPC .................................. *C08F 210/16* (2013.01)

(58) Field of Classification Search
CPC ............................... C08F 2/12; C08F 4/64193
See application file for complete search history.

(56) References Cited

U.S. PATENT DOCUMENTS

| | | | |
|---|---|---|---|
| 8,067,511 B2 | 11/2011 | Shin et al. | |
| 8,088,704 B2 | 1/2012 | Kolb et al. | |
| 8,835,577 B2 | 9/2014 | Rix et al. | |
| 9,234,060 B2 | 1/2016 | Kao et al. | |
| 10,195,589 B2 | 2/2019 | Faler et al. | |
| 12,595,322 B2 | 4/2026 | Padilla-Acevedo et al. | |
| 2015/0344601 A1 | 12/2015 | Demirors et al. | |
| 2023/0098987 A1* | 3/2023 | Padilla-Acevedo | C08F 4/65927 526/170 |

FOREIGN PATENT DOCUMENTS

| | | | | |
|---|---|---|---|---|
| WO | 2011/146044 A1 | 11/2011 | | |
| WO | WO 2014/105413 A1 * | 7/2014 | C08F 210/16 |
| WO | 2019/123028 A1 | 6/2019 | | |

OTHER PUBLICATIONS

International Preliminary Report on Patentability for related PCT Application PCT/US2022/015909, mailed Aug. 24, 2023 (8 pgs).

* cited by examiner

Primary Examiner — Fred M Teskin

(57) ABSTRACT

Embodiments are directed towards a use of a biphenylphenol polymerization catalyst to make a polymer in a gas-phase or slurry-phase polymerization process conducted in a single gas-phase or slurry-phase polymerization reactor, wherein the biphenylphenol polymerization catalyst is made from a biphenylphenol polymerization precatalyst of Formula I, and wherein the biphenylphenol polymerization catalyst has a kinetic induction time of greater than 40 seconds as determined by a least squares fit of a first-order exponential for a rate of increase of an instantaneous polymerization rate for the gas-phase or slurry-phase polymerization process.

4 Claims, No Drawings

BIPHENYLPHENOL POLYMERIZATION CATALYSTS HAVING IMPROVED KINETIC INDUCTION TIMES

This application is a National Stage Application under 35 U.S.C. § 371 of International Application Number PCT/US2022/015909, filed Feb. 10, 2022, and published as WO 2022/173898 on Aug. 18, 2022, which claims the benefit to U.S. Provisional Application 63/149,492, filed Feb. 15, 2021, the entire contents of which are incorporated herein by reference in its entirety.

FIELD OF DISCLOSURE

Embodiments of the present disclosure are directed towards biphenylphenol polymerization precatalysts and biphenylphenol polymerization catalysts formed therefrom, more specifically, to biphenylphenol polymerization precatalysts of Formula I and biphenylphenol polymerization catalysts made therefrom that have improved induction times.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including a use of a biphenylphenol polymerization catalyst to make a polymer in a gas-phase or slurry-phase polymerization process conducted in a single gas-phase or slurry-phase polymerization reactor, wherein the biphenylphenol polymerization catalyst is made from a biphenylphenol polymerization precatalyst of Formula I:

(Formula I)

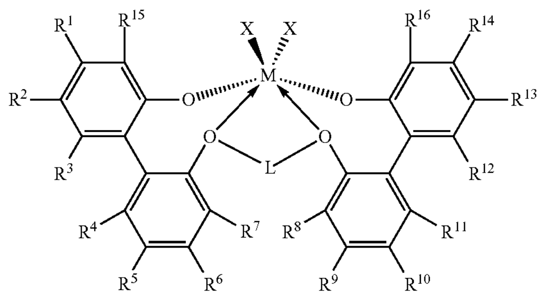

wherein each of $R^1$, $R^2$, $R^3$, $R^4$, $R^5$, $R^{10}$, $R^{11}$, $R^{12}$, $R^{13}$, and $R^{14}$ is independently a $C_1$ to $C_{20}$ alkyl, aryl or aralkyl, a hydrogen, halogen, or silyl group;

wherein each of $R^{15}$ and $R^{16}$ is a 2,7-disubstituted carbazol-9-yl;

wherein L is a saturated $C_4$ alkyl that forms a bridge between the two oxygen atoms to which L is covalently bonded;

wherein each X independently is a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, —$CH_2Si(R^C)_3$, where $R^C$ is $C_1\text{-}C_{12}$ hydrocarbon;

wherein each of $R^7$ and $R^8$ is independently a $C_1$ to $C_{20}$ alkyl, aryl or aralkyl or a hydrogen; wherein at least one of $R^7$ and $R^8$ comprises a $C_1$ to $C_{20}$ alkyl, aralkyl, or hydrogen;

wherein M is Zr or Hf;

wherein each of $R^6$ and $R^9$ is independently a halogen, $C_1$ to $C_{20}$ alkyl, aryl or aralkyl or a hydrogen; and wherein a biphenylphenol polymerization catalyst has a kinetic induction time of greater than 40 seconds as determined by a least squares fit of a first-order exponential for a rate of increase of an instantaneous polymerization rate for the gas-phase or slurry-phase polymerization process.

A biphenylphenol polymerization precatalyst selected from a group consisting of structures (i), (ii), (iii), (iv), and (v), as detailed herein.

A method of making a biphenylphenol polymerization catalyst, the method comprising contacting, under activating conditions, a biphenylphenol polymerization precatalyst of Formula I with an activator so as to activate the biphenylphenol polymerization precatalyst of Formula I, thereby making the biphenylphenol polymerization catalyst that has a kinetic induction time of greater than 40 seconds as determined by a least squares fit of a first-order exponential for a rate of increase of an instantaneous polymerization rate.

A method of making a polyethylene, the method comprising polymerizing an olefin monomer in a polymerization reactor in presence of the biphenylphenol polymerization catalyst to make a polyethylene composition.

DETAILED DESCRIPTION

The biphenylphenol polymerization precatalyst herein can be represented by the Formula I:

(Formula I)

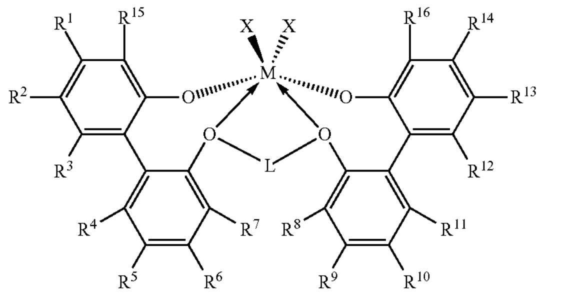

wherein each of $R^1$, $R^2$, $R^3$, $R^4$, $R^5$, $R^{10}$, $R^{11}$, $R^{12}$, $R^{13}$, and $R^{14}$ is independently a $C_1$ to $C_{20}$ alkyl, aryl or aralkyl, a hydrogen, halogen, or silyl group;

wherein each of $R^{15}$ and $R^{16}$ is a 2,7-disubstituted carbazole-9-yl;

wherein L is a saturated $C_4$ alkyl that forms a bridge between the two oxygen atoms to which L is covalently bonded;

wherein each X independently is a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, —$CH_2Si(R^C)_3$, where $R^C$ is $C_1\text{-}C_{12}$ hydrocarbon;

wherein each of $R^7$ and $R^8$ is independently a $C_1$ to $C_{20}$ alkyl, aryl or aralkyl or a hydrogen; wherein at least one of $R^7$ and $R^8$ comprises a $C_1$ to $C_{20}$ alkyl, aralkyl, or hydrogen;

wherein M is Zr or Hf;

wherein each of $R^6$ and $R^9$ is independently a halogen, $C_1$ to $C_{20}$ alkyl, aryl or aralkyl or a hydrogen.

Surprisingly, biphenylphenol polymerization catalysts made from the biphenylphenol polymerization precatalysts of the disclosure can exhibit improved (longer) kinetic induction times, as detailed herein, and yet provide resultant polymers having suitable properties such as an improved (higher) molecular weight as compared to polymers made with other (non-inventive) polymerization catalysts at similar polymerization conditions, as detailed herein. Longer kinetic induction times are desirable in some applications. Higher molecular weight polymers are desirable in some applications.

In addition, surprisingly the biphenylphenol polymerization catalysts of the disclosure can act to moderate thermal behavior of the polymerization reactor during polymerization, as detailed herein. For instance, the biphenylphenol polymerization catalysts of the disclosure can exhibit an improved (lower) initial temperature increase (i.e., a lower exotherm), as compared with other (non-inventive) polymerization catalysts at similar polymerization conditions. A lower initial temperature increase is desirable in some applications.

As mentioned, each of $R^1$, $R^2$, $R^3$, $R^4$, $R^5$, $R^{10}$, $R^{11}$, $R^{12}$, $R^{13}$, and $R^{14}$, as shown in Formula I, can independently be a $C_1$ to $C_{20}$ alkyl, aryl or aralkyl, a hydrogen, halogen, or silyl group. One or more embodiments provide that each of $R^5$ and $R^{10}$ is a and $R^8$ is a $C_1$ to $C_{20}$ alkyl, aryl or aralkyl, halogen, or a hydrogen. One or more embodiments provide that each of $R^6$ and $R^9$ is independently a halogen, $C_1$ to $C_{20}$ alkyl, aryl or aralkyl or a hydrogen. For instance, in one or more embodiments each of $R^6$ and $R^9$ can independently be a halogen or a hydrogen. One or more embodiments provide that each of $R^1$, $R^3$, $R^4$, $R^6$, $R^9$, $R^{11}$, $R^{12}$, and $R^{14}$ is a hydrogen.

As used herein, a "catalyst" or "polymerization catalyst" may include any compound that, when activated, is capable of catalyzing the polymerization or oligomerization of olefins, wherein the catalyst compound comprises at least one Group 3 to 12 atom, and optionally at least one leaving group bound thereto.

As used herein, an "alkyl" includes linear, branched and cyclic paraffin radicals that are deficient by one hydrogen. Thus, for example, a $CH^3$ group ("methyl") and a $CH_3CH_2$ group ("ethyl") are examples of alkyls.

As used herein, "aryls" include phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$—aromatic structure is a "phenyl", a $C_6H_4$—aromatic structure is a "phenylene".

As used herein, an "aralkyl", which can also be called an "aralkyl", is an alkyl having an aryl pendant therefrom. It is understood that an "aralkyl" can be a $C_7$ to $C_{20}$ aralkyl. An "alkylaryl" is an aryl having one or more alkyls pendant therefrom.

As used herein, a "silyl group" refers to hydrocarbyl derivatives of the silyl group R3Si such as $H_3$ Si. That is each R in the formula R3Si can independently be a hydrogen, an alkyl, an aryl, or an aralkyl. As used herein, a "substituted silyl" refers to silyl group substituted with one or more substituent groups (e.g., methyl or ethyl). As used herein, a "hydrocarbyl" includes aliphatic, cyclic, olefinic, acetylenic and aromatic radicals (i.e., hydrocarbon radicals) comprising hydrogen and carbon that are deficient by one hydrogen.

As mentioned, each of $R^{15}$ and $R^{16}$, as shown in Formula I, can independently be a 2,7-disubstituted carbazole-9-yl. As used herein, a "disubstituted carbazole-9-yl" refers to a polycyclic aromatic hydrocarbon including two six-membered benzene rings fused on either side of a five-membered nitrogen-containing ring, where the two-six membered rings are each substituted. For instance, one or more embodiments provide that each of $R^{15}$ and $R^{16}$ is a 2,7-di-t-butlycarbazole-9-yl.

As mentioned, $R^7$ and $R^8$, as shown in Formula I can be a $C_1$ to $C_{20}$ alkyl, aralkyl, aryl, aralkyl, hydrogen, and/or halogen, wherein at least one of $R^7$ and $R^8$ comprises a $C_1$ to $C_{20}$ alkyl, aralkyl, hydrogen, and/or halogen. One or more embodiments provide that each of $R^7$ and $R^8$ is a $C_1$ alkyl e.g., methyl. One or more embodiments provide that one of $R^7$ and $R^8$ is a $C_1$ alkyl e.g., methyl, and the other $R^7$ and $R^8$ is hydrogen.

One or more embodiments provide that each of $R^5$ and $R^{10}$ is a halogen. One or more embodiments provide that each of $R^5$ and $R^{10}$ is a fluorine.

One or more embodiments provide each of $R^2$ and $R^{13}$, as shown in Formula I, can independently be a $C_1$ to $C_{20}$ alkyl, aryl or aralkyl or a hydrogen. One or more embodiments provide that each of $R^2$ and $R^{13}$ is a 1,1-dimethylethyl.

As mentioned, L, as shown in Formula I, can be a saturated $C_4$ alkyl that forms a bridge between the two oxygen atoms to which L is covalently bonded. One or more embodiments provide that L is a $C_4$ alkyl that forms a 4-carbon bridge between the two oxygen atoms to which L is covalently bonded. In such embodiments, the $C_4$ alkyl can be selected from a group consisting of n-butyl and 2-methylpentyl.

As mentioned, each X, as shown in Formula I, can independently a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, $—CH_2Si(R^C)_3$, where $R^C$ is $C_1\text{-}C_{12}$ hydrocarbon. One or more embodiments provide that each X is a $C_1$ alkyl.

As mentioned, M, as shown in Formula I, can be zirconium (Zr) or hafnium (Hf). Stated, differently, in some embodiments M is a heteroatom (metal atom) selected from a group consisting of Zr and Hf One or more embodiments provide that each M is a Hf. One or more embodiments provide that each M is a Zr.

Each of the R groups ($R^1$-$R^{16}$) and the X's of Formula I, as described herein, can independently be substituted or unsubstituted. For instance, in some embodiments, each of the X's of Formula I can independently be a $(C_1\text{-}C_6)$alkyl-substituted $(C_6\text{-}C_{12})$aryl, or a $(C_1\text{-}C_6)$alkyl-substituted benzyl. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof The biphenylphenol polymerization precatalyst of Formula I (i.e., the biphenylphenol polymerization precatalyst) can be made utilizing reactants mentioned herein. The biphenylphenol polymerization precatalyst can be made by a number of processes, e.g. with conventional solvents, reaction conditions, reaction times, and isolation procedures, utilized for making known catalysts.

One or more embodiments provide a biphenylphenol polymerization catalyst. The biphenylphenol polymerization catalyst can be made by contacting, under activating conditions such as those described herein, the biphenylphenol polymerization precatalyst of structures i, ii, iii, iv and/or v, as described herein, with an activator to provide an activated biphenylphenol polymerization catalyst. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. The activator may also be referred to as a "co-catalyst". As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(p erfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having —All—O— subunits, where R is an alkyl group. Examples of aluminoxanes include, but are not limited to, methylaluminoxan" (""AO"), modified methylaluminoxan" ("M"AO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxan" ("M"AO") type 3 A (commercially available from Akzo Chemicals, Inc. under the trade name Modified Methylaluminoxane type 3 A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("T"AL"), triisobutylaluminum ("Ti"Al"), tri-n-hexylaluminum, tri-n-octylaluminum, tripropylaluminum, tributylaluminum, and combinations thereof.

A biphenylphenol polymerization catalyst made from the biphenylphenol polymerization precatalyst can be utilized to make a polymer. For instance, a biphenylphenol polymerization catalyst can be contacted with an olefin under polymerization conditions to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer. For instance, the polymerization process can be a gas-phase or slurry-phase polymerization process. In some embodiments, the polymerization process consists of a gas-phase polymerization process. In some embodiments the polymerization process consists of a slurry-phase polymerization process.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 1 wt % to 100 wt %, it is understood that the polymer unit in the copolymer is derived from ethylene in the polymerization reaction and the derived units are present at 1 wt % to 100 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas-phase polymerization process. In another embodiment, ethylene and/or propylene can be polymerized with at least two different comonomers, optionally one of which may be a diene, to make a terpolymer.

One or more embodiments provide that the polymer can include from 1 to 100 wt % of units derived from ethylene based on a total weight of the polymer. All individual values and subranges from 1 to 100 wt % are included; for example, the polymer can include from a lower limit of 1, 5, 10, 30, 40, 50, 60, or 70 wt % of units derived from ethylene to an upper limit of 100, 99, 95, 90, or 85 wt % of units derived from ethylene based on the total weight of the polymer.

As mentioned, surprisingly, biphenylphenol polymerization catalysts made from the biphenylphenol polymerization precatalysts can exhibit improved (longer) kinetic induction times, as detailed herein, and yet provide resultant polymers having suitable properties such as an improved (higher) molecular weight as compared to polymers made with other (non-inventive) polymerization catalysts at similar polymerization conditions, as detailed herein. For instance, biphenylphenol polymerization catalysts made from the biphenylphenol polymerization precatalyst can have a kinetic induction time of greater than 40 seconds as determined by a least squares fit of a first-order exponential for a rate of increase of an instantaneous polymerization rate.

For instance, in one or more embodiments, polymerization catalysts made from the biphenylphenol polymerization precatalyst can have a kinetic induction time in a range of from 40 to 500 seconds. All individual values and subranges 40 to 500 seconds are included. For instance, the induction time can be in a range from 40 to 250 seconds, 40 to 100 seconds, or 40 to 80 seconds, as compared to other polymerization catalysts that exhibit induction times of less than 40 seconds during polymerization when both polymerizations occur at a same polymerization temperature and conditions such as a same hydrogen concentration and/or a same comonomer to monomer ratio. Without wishing to be bound by theory, it is believed that the longer induction time can desirably moderate thermal behavior of the polymerization reactor during polymerization, as detailed herein, as compared to catalysts with shorter (quicker) induction times at similar conditions that may lead to operability issues such as operability issues in a gas-phase polymerization reactor. In one or more embodiments of the biphenylphenol polymerization precatalyst, when employed in a gas-phase or slurry-phase polymerization reactor under gas-phase or slurry-phase polymerization conditions can have a kinetic induction time that is at least 50 percent longer than the comparative catalysts and/or kinetic induction times of at least 40 seconds.

In addition, as mentioned, surprisingly the biphenylphenol polymerization precatalyst can help to provide polymers having an improved, i.e., higher, molecular weights as compared to polymers made with other polymerization catalysts at similar polymerization conditions. For instance, the biphenylphenol polymerization catalysts of the disclosure can help to provide polymers having an increased molecular weights, as compared to polymers made with other polymerization catalysts when both polymerizations occur at a same polymerization temperature and conditions such as a same hydrogen concentration and/or a same comonomer to monomer ratio. Embodiments provide that the polymer can have a Mw (weight average molecular weight) from 200,000 to 1,100,000. All individual values and subranges from 200,000 to 1,100,000 are included; for example, the polymer can have a Mw from a lower limit of 300,000; 250,000; or 200,000; to an upper limit of 1,100,000; 1,000,000; 900,000; 800,000; 700,000; 600,000; or 500,000. In some embodiments the Mw can be in a range from 1,007,300 to 250,100.

Embodiments provide that the polymer can have a Mn (number average molecular weight) from 30,000 to 225,000. All individual values and subranges from 30,000 to 225,000 are included; for example, the polymer can have a Mn from a lower limit of 30,000; 40,000; or 50,000; to an upper limit of 225,000; 220,000; 200,000; 150,000; 130,000; 100,000; or 75,000. In some embodiments the Mn can be in a range from 220,800 to 32,700.

Embodiments provide that the polymer can have a Mz (z-average molecular weight) from 400,000 to 2,500,000. All individual values and subranges from 400,000 to 250,000,000 are included; for example, the polymer can have a Mz from a lower limit of 400,000; 500,000; 750,000 or 1,000,000; to an upper limit of 2,500,000; 2,000,000; or 1,500,000. In some embodiments the Mz can be in a range from 2,322,675 to 455,856.

Embodiments provide that the polymer can have a polydispersity index (PDI), determined as Mw/Mn (weight average molecular weight/number average molecular weight) in a range of from 3.00 to 12.00. All individual values and subranges from 3.00 to 12.00 are included; for example, the polymer can have a Mw/Mn from a lower limit of 3.00; 3.50; 4.00; 4.50; or 4.7 to an upper limit of 12.00; 11.3; 8.00; 7.50; 7.00; or 6.50. In some embodiments the Mw/MN can be in a range from 4.7 to 11.3.

Embodiments provide that the polymer can have a comonomer percent (%) in a range of from 1.0 to 5.0. All individual values and subranges from 1.0 to 5.0 are included; for example, the polymer can have a comonomer percent from a lower limit of 1.0; 1.5; or 2.0; to an upper limit of 5.0; 4.0; 3.4; or 2.5. In some embodiments the comonomer % can be in a range from 1.0 to 3.4.

Embodiments provide that the biphenylphenol polymerization catalyst made from the biphenylphenol polymerization precatalyst can have a gas-phase initial polymerization reactor temperature increase of less than 10 °C, as described herein. For instance, a biphenylphenol polymerization catalyst made from the biphenylphenol polymerization precatalyst can have a gas-phase initial polymerization reactor temperature increase of less than 10 °C, of less than 5 °C, of less than 3 °C, or less than 1 °C. For instance, in one or more embodiments that the biphenylphenol polymerization catalyst made from the biphenylphenol polymerization precatalyst can have a gas-phase initial polymerization reactor temperature increase of less than 3 °C.

Embodiments provide that the polymer can have a density of from 0.890 g/$cm^3$ to 0.970 g/$cm^3$ · All individual values and subranges from 0.890 to 0.970 g/$cm^3$ are included; for example, the polymer can have a density from a lower limit of 0.890, 0.900, 0.910, or 0920 g/$cm^3$ to an upper limit of 0.970, 0.960, 0.950, or 0.940 g/$cm^3$. Density can be determined in accordance with ASTM D-792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter ($g/cm^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160 °C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160 °C with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_x = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.00017 and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

Polymer made with the biphenylphenol polymerization catalysts herein can be utilized for a number of articles such as films, fibers, nonwoven and/or woven fabrics, extruded articles, and/or molded articles, among others.

Also provided is a polymodal catalyst system comprising the biphenylphenol polymerization precatalysts or an activation reaction product thereof and at least one olefin polymerization catalyst (second catalyst) that is not the biphenylphenol polymerization precatalysts or an activation reaction product thereof. Such a second catalyst may be a Ziegler-Natta catalyst, a chromium-based catalyst (e.g., a so-called Phillips catalyst), a metallocene catalyst that contains or is free of an indenyl ring (e.g., a metallocene catalyst that contains unsubstituted and/or alkyl-substituted cyclopentadienyl rings), a Group 15 metal-containing catalyst compound described in paragraphs [0041] to [0046] of WO 2018/064038 A1, or a biphenylphenolic catalyst compound described in paragraphs [0036] to [0080] of US20180002464 A1.

The biphenylphenol polymerization precatalysts, as well as other components discussed herein such as the activator, biphenylphenol polymerization catalysts, and/or an additional polymerization component, may be utilized with a support. A "support", which may also be referred to as a "carrier", refers to any support material, including a porous support material, such as talc, inorganic oxides, and inorganic chlorides.

The biphenylphenol polymerization precatalysts and/or biphenylphenol polymerization catalysts, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 $m^2/g$, pore volume in the range of from about 0.1 to about 4.0 $g/cm^3$ and average particle size in the range of from about 5 to about 500 μm. More preferably, the surface area of the support material is in the range of from about 50 to about 500 $m^2/g$, pore volume of from about 0.5 to about 3.5 $g/cm^3$ and average particle size of from about 10 to about 200 μm. Most preferably the surface area of the support material is in the range is from about 100 to about 400 $m^2/g$, pore volume from about 0.8 to about 3.0 $g/cm^3$ and average particle size is from about 5 to about 100 μm. The average pore size of the carrier typically has pore size in the range of from 10 to 1000 A, preferably 50 to about 500 A, and most preferably 75 to about 350 A.

A molar ratio of metal in the activator to metal in the biphenylphenol polymerization precatalyst may be 1000:1 to 0.5:1, 300:1 to 1:1, or 150:1 to 1:1. One or more diluents, e.g., fluids, can be used to facilitate the combination of any two or more components. For example, the biphenylphenol polymerization precatalyst and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the biphenylphenol polymerization catalyst/activator can be added to the support. The slurry may be fed to the polymerization reactor for the polymerization process, and/or the slurry may be dried, e.g., spray-dried, prior to being fed to the polymerization reactor for the polymerization process.

The polymerization process may utilize using known equipment and reaction conditions, e.g., known polymerization conditions. The polymerization process is not limited to any specific type of polymerization system. As an example, polymerization temperatures may range from about 0 °C to about 300 °C at atmospheric, sub-atmospheric, or super-atmospheric pressures. Embodiments provide a method of making a polyolefin polymer the method comprising: contacting, under polymerization conditions, an olefin with the biphenylphenol polymerization catalysts, as described herein, to polymerize the olefin, thereby making a polyolefin polymer.

One or more embodiments provide that the polymers may be formed via a gas-phase polymerization system, at super-atmospheric pressures in the range from 0.07 to 68.9 bar, from 3.45 to 27.6 bar, or from 6.89 to 24.1 bar, and a temperature in the range from 30 °C to 130 °C, from 65 °C to 110 °C, from 75 °C to 120 °C, or from 80 °C to 120 °C. For one or more embodiments, the temperature may be 80 °C, 90 °C, or 100 °C. Stirred and/or fluidized bed gas-phase polymerization systems may be utilized.

Generally, a conventional gas-phase fluidized bed polymerization process can be conducted by passing a stream containing one or more olefin monomers continuously through a fluidized bed polymerization reactor under reaction conditions and in the presence of a catalytic composition, e.g., a composition including the activated biphenylphenol polymerization precatalysts, at a velocity sufficient to maintain a bed of solid particles in a suspended state. A stream comprising unreacted monomer can be continuously withdrawn from the polymerization reactor, compressed, cooled, optionally partially or fully condensed, and recycled back to the reactor. Product, i.e., polymer, can be withdrawn from the polymerization reactor and replacement monomer can be added to the recycle stream. Gases inert to the catalytic composition and reactants may also be present in the gas stream. The polymerization system may include a single polymerization reactor or two or more polymerization reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the polymerization reactor at a single or multiple and different locations.

For the polymerization process, biphenylphenol polymerization catalyst may be continusouly fed to the polymerization reactor. A gas that is inert to the polymerization catalyst, such as nitrogen or argon, can be used to carry the polymerization catalyst into the polymerization reactor bed.

In one embodiment, the biphenylphenol polymerization catalyst can be provided as a slurry in mineral oil or liquid hydrocarbon or mixture such, as for example, propane, butane, isopentane, hexane, heptane or octane. The slurry may be delivered to the polymerization reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the polymerization reactor that can be in a range of about 0.0 to 1.0, in a range of 0.01 to 0.7, in a range of 0.03 to 0.5, or in a range of 0.005 to 0.4. A number of embodiments utilize hydrogen gas. In some embodiments the gas mole ratio of hydrogen to ethylene in the polymerization reactor can be 0.0068, 0.0017, 0.0016, or 0.0011.

A number of aspects of the present disclosure are provided as follows.

Aspect 1 provides a use of a biphenylphenol polymerization catalyst to make a polymer in a gas-phase or slurry-phase polymerization process conducted in a single gas-phase or slurry-phase polymerization reactor, wherein the biphenylphenol polymerization catalyst is made from a biphenylphenol polymerization precatalyst of Formula I:

(Formula I)

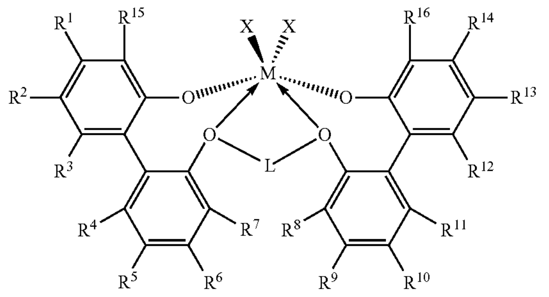

wherein each of $R^1$, $R^2$, $R^3$, $R^4$, $R^5$, $R^{10}$, $R^{11}$, $R^{12}$, $R^{13}$ and $R^{14}$ is independently a $C_1$ to $C_{20}$ alkyl, aryl or aralkyl, a hydrogen, halogen, or silyl group;

wherein each of $R^{15}$ and $R^{16}$ is a 2,7-disubstituted carbazol-9-yl;

wherein L is a saturated $C_4$ alkyl that forms a bridge between the two oxygen atoms to which L is covalently bonded;

wherein each X independently is a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, $—CH_2Si(R^C)_3$, where $R^C$ is $C_1\text{-}C_{12}$ hydrocarbon;

wherein each of $R^7$ and $R^8$ is independently a $C_1$ to $C_{20}$ alkyl, aryl or aralkyl or a hydrogen; wherein at least one of $R^7$ and $R^8$ comprises a $C_1$ to $C_{20}$ alkyl, aralkyl, or hydrogen;

wherein M is Zr of Hf;

wherein each of $R^6$ and $R^9$ is independently a halogen, $C_1$ to $C_{20}$ alkyl, aryl or aralkyl or a hydrogen; and wherein a biphenylphenol polymerization catalyst has a kinetic induction time of greater than 40 seconds as determined by a least squares fit of a first-order exponential for a rate of increase of an instantaneous polymerization rate for the gas-phase or slurry-phase polymerization process.

Aspect 2 provides the use of Aspect 1, wherein each of $R^5$ and $R^{10}$ is a halogen.

Aspect 3 provides the use of Aspect 1, wherein each of $R^5$ and $R^{10}$ is fluorine.

Aspect 4 provides the use of Aspect 1, wherein each of $R^7$ and $R^8$ comprises a $C_1$ alkyl; or $R^7$ or $R^8$ comprises a $C_1$ alkyl and the other of $R^7$ or $R^8$ comprises a hydrogen.

Aspect 5 provides the use of any one of Aspects 1-4, wherein each of $R^2$ and $R^{13}$ comprises a 1,1-dimethylethyl.

Aspect 6 provides the use of any of any one of Aspects 1-5, wherein each of $R^{15}$ and $R^{16}$ comprises a 2,7-di-t-butylcarbazol-9-yl.

Aspect 7 provides the use of any one of Aspects 1-6, wherein L comprises a $C_4$ alkyl.

Aspect 8 provides the use of Aspect 7, wherein the $C_4$ alkyl is selected from a group consisting of n-butyl and 2-methyl-pentyl.

Aspect 9 provides the use of Aspect 1, wherein each X comprises a $C_1$ alkyl.

Aspect 10 provides the use of Aspect 1, wherein M is Zr.

Aspect 11 provides the use of Aspect 1, wherein M is Hf.

Aspect 12 provides the use of Aspect 1, wherein each of $R^5$ and $R^{10}$ is a fluorine.

Aspect 12 provides a biphenylphenol polymerization precatalyst selected from a group consisting of structures (i), (ii), (iii), (iv), and (v), as detailed herein.

Aspect 13 provides a method of making a biphenylphenol polymerization catalyst, the method comprising contacting, under activating conditions, a biphenylphenol polymerization precatalyst of Formula I with an activator so as to activate the biphenylphenol polymerization precatalyst of Formula I, thereby making the biphenylphenol polymerization catalyst that has a kinetic induction time of greater than 40 seconds as determined by a least squares fit of a first-order exponential for a rate of increase of an instantaneous polymerization rate.

Aspect 14 provides a method of making a polyethylene, the method comprising: polymerizing an olefin monomer in a polymerization reactor in presence of the biphenylphenol polymerization catalyst of Aspect 13 to make a polyethylene composition.

Aspect 15 provides wherein the biphenylphenol polymerization catalyst of Aspect 14 is introduced into the polymerization reactor in the form of: a slurry including the biphenylphenol polymerization catalyst; or a spray-dried catalyst composition including the biphenylphenol polymerization catalyst.

EXAMPLES

Biphenylphenol polymerization precatalysts of Formula (I), as shown below, and biphenylphenol polymerization catalyst formed therefrom were prepared as follows.

(Formula I)

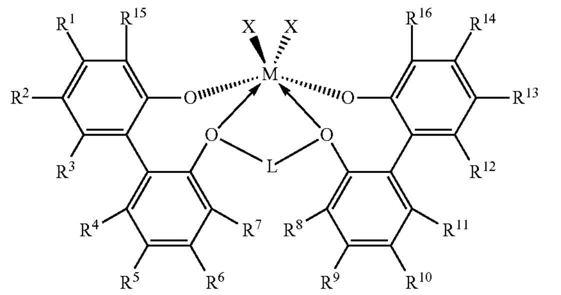

wherein each of $R^5$ and $R^{10}$ is independently a $C_1$ to $C_{20}$ alkyl, aralkyl, halogen, or a hydrogen;

wherein each of $R^2$ and $R^{13}$ is independently a $C_1$ to $C_{20}$ alkyl, aryl or aralkyl or a hydrogen;

wherein each of $R^{15}$ and $R^{16}$ is a 2,7-disubstituted carbazol-9-yl;

wherein L is a saturated $C_4$ alkyl that forms a bridge between the two oxygen atoms to which L is covalently bonded;

wherein each X independently is a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, $-CH_2Si(R^C)_3$, where $R^C$ is $C_1\text{-}C_{12}$ hydrocarbon;

wherein each of $R^7$ and $R^8$ is independently a $C_1$ to $C_{20}$ alkyl, aryl or aralkyl or a hydrogen; wherein at least one of $R^7$ and $R^8$ comprises a $C_1$ to $C_{20}$ alkyl, aralkyl, or hydrogen;

wherein M is Zr or Hf;

wherein each of $R^1$, $R^3$, $R^4$, $R^6$, $R^9$, $R^{11}$, $R^{12}$, and $R^{14}$ is independently a halogen or a hydrogen.

The biphenylphenol polymerization precatalyst of Example 1 (EX1) is prepared as follows according to the following synthetic steps:

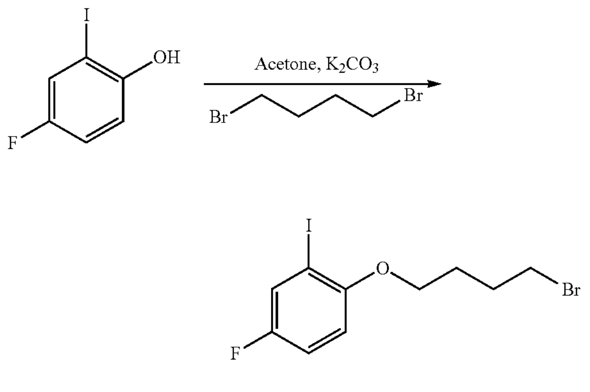

Synthesis of 1-(4-bromobutoxy)-4-fluoro-2-iodobenzene: A three-necked round bottom flask equipped with a stir bar, septa, a condenser, and a nitrogen gas inlet was charged 4-fluoro-2-iodophenol (3.20 g, 13.45 mmol, preparation published on US2015/0291713 A1), anhydrous potassium carbonate (3.79 g, 27.45 mmol), 1,4-dibromobutane (28 mL, 234.47 mmol), and acetone (92 mL). The mixture was stirred at reflux for 3 hours and was then allowed to cool to room temperature. The mixture was filtered, the solids were wash with acetone, and the filtrate was concentrated by rotary evaporation to remove acetone. To remove the excess 1,4-dibromobutane, the remaining yellow solution was heated at 60 °C and was distilled under high vacuum using a short path distillation head while slowly increasing the temperature to afford 4.45 g (88.8%) of the product as a light brown oil.

$^1$H-NMR (400 MHz, $CDCl_3$) δ 7.48 (dd, J=7.6, 3.0 Hz, 1H), 7.00 (ddd, J=9.0, 7.8, 3.0 Hz, 1H), 6.71 (dd, J=9.0, 4.6 Hz, 1H), 3.99 (t, J=5.9 Hz, 2H), 3.53 (t, J=6.6 Hz, 2H), 2.18-2.09 (m, 3H), 2.02-1.94 (m, 2H). $^{13}$C-NMR (101 MHz, $CDCl_3$) δ 156.64 (d, J=244.0 Hz), 153.93 (d, J=2.2 Hz), 125.94 (d, J=25.0 Hz), 115.48 (d, J=22.7 Hz), 112.05 (d, J=8.2 Hz), 85.94 (d, J=8.3 Hz), 68.74, 33.54, 29.42, 27.63. $^{19}$F-NMR (376 MHz, $CDCl_3$) δ −122.33 (td, J=7.9, 4.8 Hz).

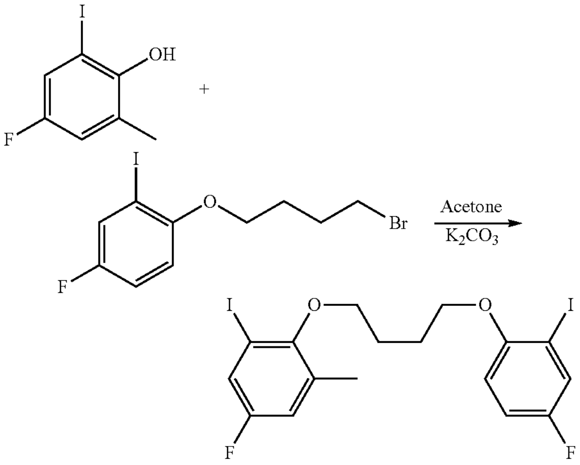

Synthesis of 5-fluoro-2-(2-(4-fluoro-2-iodophenoxy) ethoxy)-1-iodo-3-methylbenzene: A three-necked round bottom flask equipped with a stir bar, septa, a condenser, and a nitrogen gas inlet was charged with 1-(4-bromobutoxy)-4-fluoro-2-iodobenzene (3.66 g, 9.81 mmol), 4-fluoro-2-iodo-6-methylphenol (2.47 g, 9.82 mmol, preparation published on US2015/0291713 A1), anhydrous potassium carbonate (2.87 g, 20.76 mmol), and acetone (66 mL). The mixture was stirred at reflux for 5.5 hours and was then allowed to cool to room temperature. The mixture was filtered, the solids were wash with acetone, and the filtrate was concentrated by rotary evaporation to afford a crude dark red oil (5.30 g). The oil dissolved in a minimal amount of hexanes and was purified by flash column chromatography (ISCO, 330 g silica gel, 0-5% ethyl acetate in hexanes). The fractions containing the product were combined and concentrated by rotary evaporation to afford a yellow oil. To remove traces of ethyl acetate, the oil was dissolved in dichloromethane and concentrated by rotary evaporation to afford a yellow oil (repeated twice). The oil was dried under high vacuum to afford 4.33 g (81.2%) of the product as a yellow oil.

$^1$H NMR (400 MHz, $CDCl_3$) δ 7.50 (dd, J=7.6, 3.0 Hz, 1H), 7.31 (ddd, J=7.5, 3.0, 0.7 Hz, 1H), 7.01 (ddd, J=9.0, 7.8, 3.0 Hz, 1H), 6.91-6.85 (m, 1H), 6.76 (dd, J=9.0, 4.6 Hz, 1H), 4.12-4.05 (m, 2H), 3.95-3.88 (m, 2H), 2.32 (s, 2H), 2.14-2.09 (m, 4H). $^{13}$C NMR (101 MHz, $CDCl_3$) δ 158.71 (d, J=168.7 Hz), 156.27 (d, J=165.2 Hz), 154.13 (d, J=1.9 Hz), 153.41 (d, J=1.5 Hz), 133.04 (d, J=8.3 Hz), 125.95 (d, J=24.9 Hz), 123.28 (d, J=24.8 Hz), 117.84 (d, J=22.2 Hz), 115.51 (d, J=22.6 Hz), 112.27 (d, J=8.1 Hz), 91.35 (d, J=9.5 Hz), 86.07 (d, J=8.7 Hz), 72.45 (d, J=1.4 Hz), 69.61, 26.91, 26.00, 17.30 (d, J=1.5 Hz). $^{19}$F NMR (376 MHz, $CDCl_3$) δ −118.22 (t, J=8.1 Hz), −122.40 (td, J=7.6, 4.5 Hz).

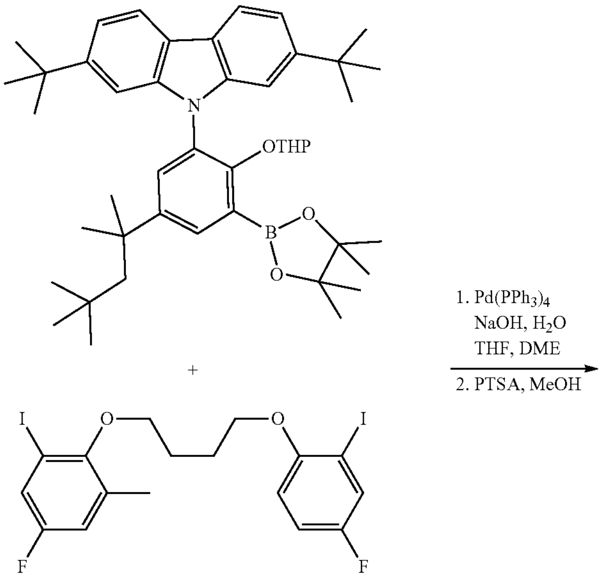

-continued

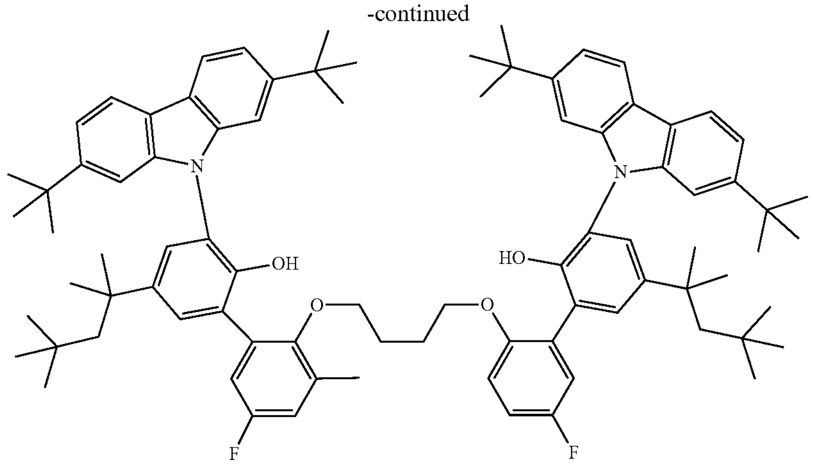

Synthesis of 3-(2,7-di-tert-butyl-9H-carbazol-9-yl)-2'-(4-((3'-(2,7-di-tert-butyl-9H-carbazol-9-yl)-5-fluoro-2'-hydroxy-5'-(2,4,4-trimethylpentan-2-yl)-[1,1'-biphenyl]-2-yl)oxy)butoxy)-5'-fluoro-3'-methyl-5-(2,4,4-trimethylpentan-2-yl)-[1,1'-biphenyl]-2-ol: A three-necked round bottom flask equipped with a stir bar, septa, a condenser, and a nitrogen gas inlet was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazol-9-yl (11.20 g, 16.15 mmol, preparation published on US2015/0291713 A1), 5-fluoro-2-(4-(4-fluoro-2-iodophenoxy)butoxy)-1-iodo-3-methylbenzene (4.18 g, 7.69 mmol), 1,2-dimethoxyethane (200 mL), tetrahydrofuran (66 mL) and a solution of sodium hydroxide (2.13 g, 53.32 mmol) in water (59 mL). The mixture was purged with nitrogen for 15 minutes, then tetrakis(triphenylphosphine)palladium(0) (0.65 g, 0.56 mmol) was added. The mixture was heated at 85 °C for 22 hours and was then allowed to cool to room temperature. The phases were separated. The organic phase was dried over magnesium sulfate, filtered, and concentrated by rotary evaporation to afford a crude golden sticky solid (16.64 g). The solid was dissolved in a mixture of tetrahydrofuran (84 mL) and methanol (84 mL). The solution was heated to 60 °C and p-toluenesulfonic acid monohydrate (0.29 g, 1.54 mmol) was added. The reaction was heated at 60 °C overnight and was allowed to cool to room temperature. The reaction was concentrated by rotary evaporation to afford crude a golden orange sticky solid (15.25 g). The solid was absorbed onto silica gel and was purified by flash column chromatography (ISCO, 330 g, 35-40% dichloromethane in hexanes). The fractions containing the product were not completely pure. The fractions were combined and concentrated by rotary evaporation to afford a light yellow crystalline solid. The solid was absorbed onto silica gel and was purified by flash column chromatography (ISCO, 330 g, 2-5% ethyl acetate in hexanes). The fractions containing the product were combined and concentrated by rotary evaporation to afford a light crystalline solid. The solid was dried under high vacuum to afford 2.37 g of the product as a light yellow crystalline solid. The fractions containing a small impurity were combine and concentrated by rotary evaporation to afford an orange crystalline solid. The solid was dissolved in dichloromethane, filtered to remove insoluble solids, and concentrated by rotary evaporation to afford an orange crystalline solid. The solid was dried under high vacuum to afford 4.47 g of the product as an orange crystalline solid. The total yield was 6.84 g (70.9%) of the product.

$^{1}$H NMR (400 MHz, Chloroform-d) δ 8.02 (dd, J=8.3, 0.6 Hz, 2H), 7.99 (dd, J=8.2, 0.6 Hz, 2H), 7.50-7.43 (two m, 2H), 7.35 (s, 2H), 7.31 (ddd, J=8.5, 7.1, 1.7 Hz, 4H), 7.14-7.09 (m, 3H), 7.09 (dd, J=1.7, 0.6 Hz, 2H), 7.02 (ddd, J=8.9, 3.2, 0.7 Hz, 1H), 6.87 (ddd, J=8.6, 3.1, 0.8 Hz, 1H), 6.72 (ddd, J=9.0, 7.8, 3.2 Hz, 1H), 6.54 (s, 1H), 6.41 (dd, J=9.1, 4.5 Hz, 1H), 5.73 (s, 1H), 3.57 (t, J=6.4 Hz, 2H), 3.48 (t, J=5.8 Hz, 2H), 2.05 (s, 2H), 1.76 (s, 2H), 1.71 (s, 2H), 1.55 (dq, J=11.4, 6.3 Hz, 2H), 1.41 (s, 8H), 1.36 (d, J=2.7 Hz, 6H), 1.30 (s, 39H), 0.82 (s, 9H), 0.79 (s, 9H). $^{13}$C NMR (101 MHz, cdcl$_3$) δ 160.19, 158.55, 157.77, 156.16, 151.19, 151.17, 149.79, 149.76, 149.04, 148.95, 147.99, 147.77, 142.94, 142.42, 141.74, 141.70, 133.63, 133.55, 133.20, 133.11, 129.35, 129.21, 129.13, 129.10, 127.62, 127.13, 126.54, 126.53, 125.90, 125.88, 125.44, 124.41, 121.04, 121.00, 119.52, 119.48, 118.60, 118.37, 117.71, 117.69, 117.31, 117.08, 116.12, 115.88, 115.28, 115.06, 114.98, 114.90, 106.34, 106.27, 73.65, 69.42, 57.17, 38.28, 38.18, 35.08, 35.07, 32.55, 32.48, 31.93, 31.88, 31.79, 31.76, 31.71, 31.64, 26.23, 25.73, 16.37, 16.35. Multiplicity due to carbon-fluorine couplings were not assigned.

$^{19}$F NMR (376 MHz, Chloroform-d) δ −118.35 (t, J=8.6 Hz), −122.62 (td, J=8.3, 4.5 Hz).

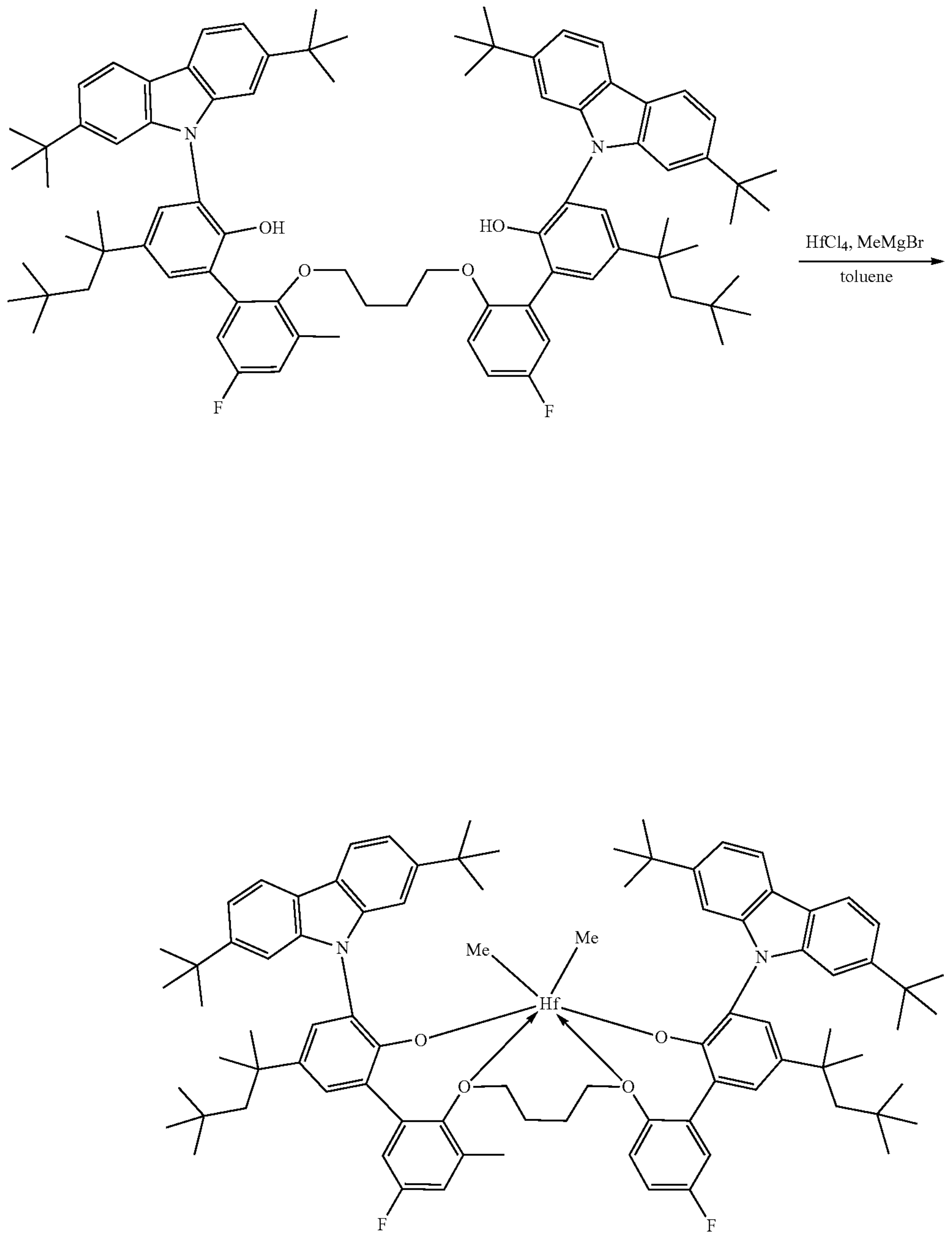

Synthesis structure (i): Reaction was set up in a glove box under nitrogen atmosphere. A jar was charged with hafnium tetrachloride (0.052 g, 0.16 mmol) and toluene (10 mL). The slurry mixture was cooled to −25 °C in the glove box freezer. To the stirring slurry cool mixture was added 3.0 M methylmagnesium bromide in diethyl ether (0.24 mL, 0.72 mmol). The mixture was stirred strongly for about 4 minutes. The solid went in solution and it turned light yellow. To the mixture was added the ligand (0.20 g, 0.16 mmol) as a solid. The resulting mixture was stirred at room temperature for 5 hours. To the mixture was then added hexane (10 mL) and filtered. The solution was concentrated under vacuum to afford 0.24 g (full conversion) of the product as a light brown color solid. Excess mass was attributed to the presence of residual toluene as observed in the proton NMR in combination with full conversion.

$^1$NMR (400 MHz, Benzene-$d_6$) δ 8.12 (d, J=8.3 Hz, 1H), 8.09 (d, J=8.2 Hz, 1H), 8.08 (d, J=8.2 Hz, 1H), 8.01 (d, J=8.3 Hz, 1H), 7.82 (d, J=1.7 Hz, 1H), 7.77-7.71 (m, 2H), 7.65 (d, J=1.6 Hz, 2H), 7.62 (d, J=2.5 Hz, 1H), 7.41-7.34 (m, 3H), 7.34-7.28 (m, 3H), 7.17 (d, J=2.5 Hz, 1H), 6.88 (ddd, J=8.7, 4.6, 3.0 Hz, 2H), 6.49 (ddd, J=9.0, 7.1, 3.2 Hz, 1H), 6.08 (dd, J=8.5, 3.2 Hz, 1H), 5.09 (dd, J=9.1, 4.9 Hz, 1H), 4.38 (t, J=11.7 Hz, 1H), 3.84-3.66 (m, 2H), 3.31 (dd, J=11.0, 7.6 Hz, 1H), 1.72 (d, J=14.5 Hz, 1H), 1.53 (dd, J=19.9, 14.5 Hz, 2H), 1.41 (s, 9H), 1.30 (s, 9H), 1.19 (s, 9H), 1.18 (s, 9H), 1.15 (s, 3H), 1.07 (d, J=6.1 Hz, 6H), 0.82 (s, 9H), 0.77 (s, 3H), 0.75 (s, 9H), −0.76 (s, 3H), −1.09 (s, 3H).

(i)
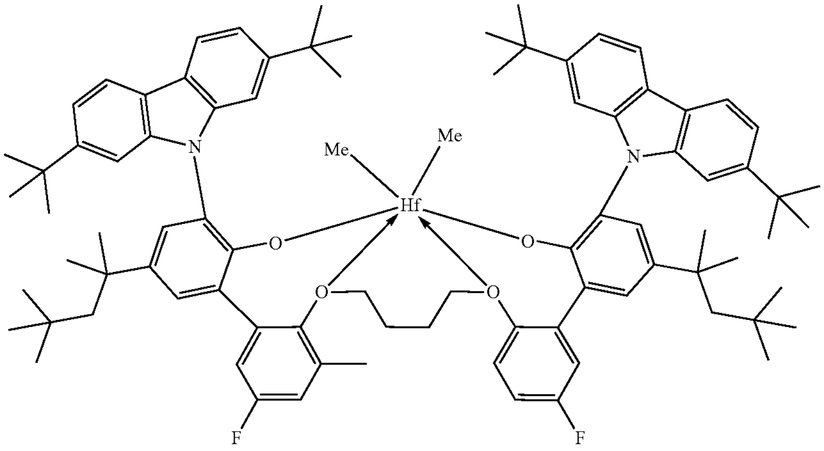
The biphenylphenol polymerization precatalyst of Example 2 (EX2) was prepared using the same ligand and methodology as the biphenylphenol polymerization catalyst of EX1 as follow:
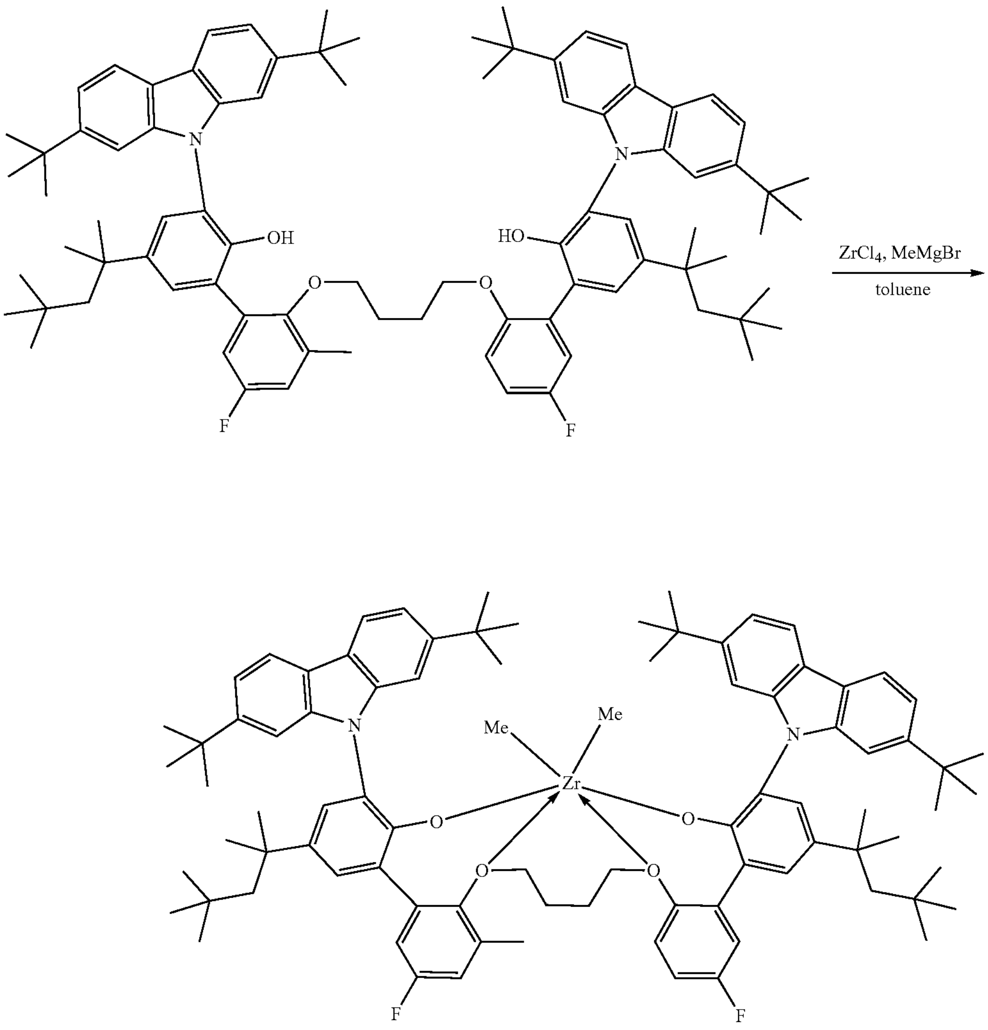

Synthesis of structure (ii): Reaction was set up in a glove box under nitrogen atmosphere. A jar was charged with zirconium tetrachloride (0.037 g, 0.16 mmol) and toluene (10 mL). The slurry mixture was cooled to −25 °C in the glove box freezer. To the stirring slurry cool mixture was added 3.0 M methylmagnesium bromide in diethyl ether (0.25 mL, 0.75 mmol). The mixture was stirred strongly for about 4 minutes. The solid went in solution and it turned brown. To the mixture was added the ligand (0.20 g, 0.16 mmol) as a solid. The resulting mixture was stirred at room temperature for 5 hours. To the mixture was then added hexane (10 mL) and filtered. The solution was concentrated under vacuum to afford 0.25 g (full conversion) of the product as a light yellow color solid. Excess mass was attributed to the presence of residual toluene as observed in the proton NMR in combination with full conversion.

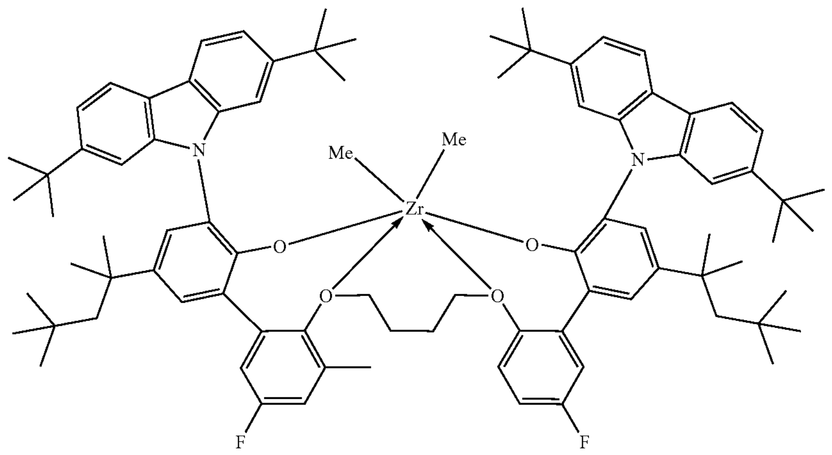

(ii)

$^{1}H$ NMR (400 MHz, Benzene-$d_6$) δ 8.18 (d, J=8.2 Hz, 1H), 8.15 (d, J=8.2 Hz, 1H), 8.08 (d, J=8.3 Hz, 1H), 7.88 (d, J=1.7 Hz, 1H), 7.80 (d, J=2.0 Hz, 2H), 7.72 (d, J=1.6 Hz, 2H), 7.69 (d, J=2.5 Hz, 1H), 7.48-7.40 (m, 2H), 7.40-7.34 (m, 3H), 7.23 (d, J=2.5 Hz, 1H), 6.99-6.90 (m, 2H), 6.55 (ddd, J=9.0, 7.1, 3.2 Hz, 1H), 6.14 (dd, J=8.5, 3.2 Hz, 1H), 5.15 (dd, J=9.1, 4.9 Hz, 1H), 4.44 (t, J=11.7 Hz, 1H), 3.91-3.70 (m, 2H), 3.37 (dd, J=11.0, 7.6 Hz, 1H), 1.78 (d, J=14.5 Hz, 1H), 1.68-1.52 (m, 2H), 1.47 (s, 9H), 1.37 (s, 9H), 1.25 (s, 10H), 1.24 (s, 9H), 1.21 (s, 4H), 1.14 (s, 3H), 1.13 (s, 3H), 0.89 (s, 9H), 0.83 (s, 3H), 0.81 (s, 10H), −0.70 (s, 3H), −1.03 (s, 3H).

The biphenylphenol polymerization precatalyst of Example 3 (EX3) was prepared as follow:

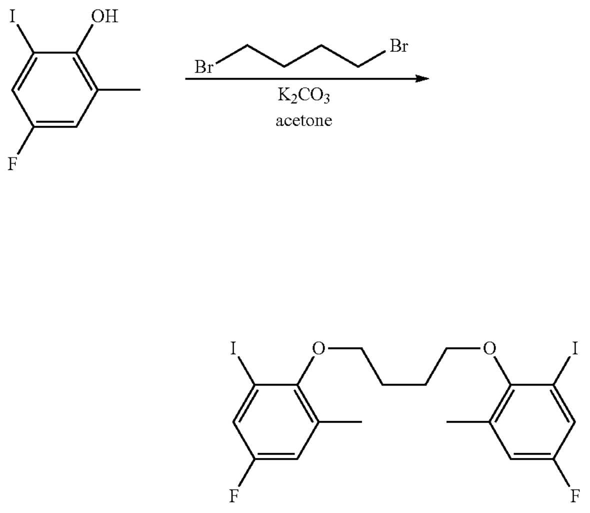

Synthesis of 1,4-bis(4-fluoro-2-iodo-6-methylphenoxy) butane: To 125 mL of acetone was added 6-iodo-4-fluoro-2-methylphenol (10.13 g, 40.21 mmol), potassium carbonate (17.04 g, 123.3 mmol) and 1,4-dibromobutane (4.34 g, 20.11 mmol). This mixture was refluxed overnight then cooled, filtered and concentrated. The residue was dissolved in methylene chloride, passed through a pad of silica gel, concentrated and recrystallized using acetonitrile to give 8.14 g (72.5%) of 96.3% pure by GC as light brown needles.

$^{1}H$ NMR (500 MHz, Chloroform-d) δ 7.33 (ddd, J=7.5, 3.1, 0.7 Hz, 2H), 6.89 (ddd, J=8.7, 3.0, 0.8 Hz, 2H), 4.00-3.89 (m, 4H), 2.35 (s, 6H), 2.17-2.13 (m, 4H). $^{13}C$ NMR (126 MHz, Chloroform-d) δ 158.54 (d, J=247.0 Hz), 153.59 (d, J=3.0 Hz), 133.25 (d, J=7.7 Hz), 123.49 (d, J=24.6 Hz), 118.03 (d, J=22.1 Hz), 91.50 (d, J=9.3 Hz), 72.76 (d, J=1.3 Hz), 27.08, 17.44 (d, J=1.5 Hz). $^{19}F$ NMR (376 MHz, Chloroform-d) δ −118.27 (t, J=8.1 Hz).

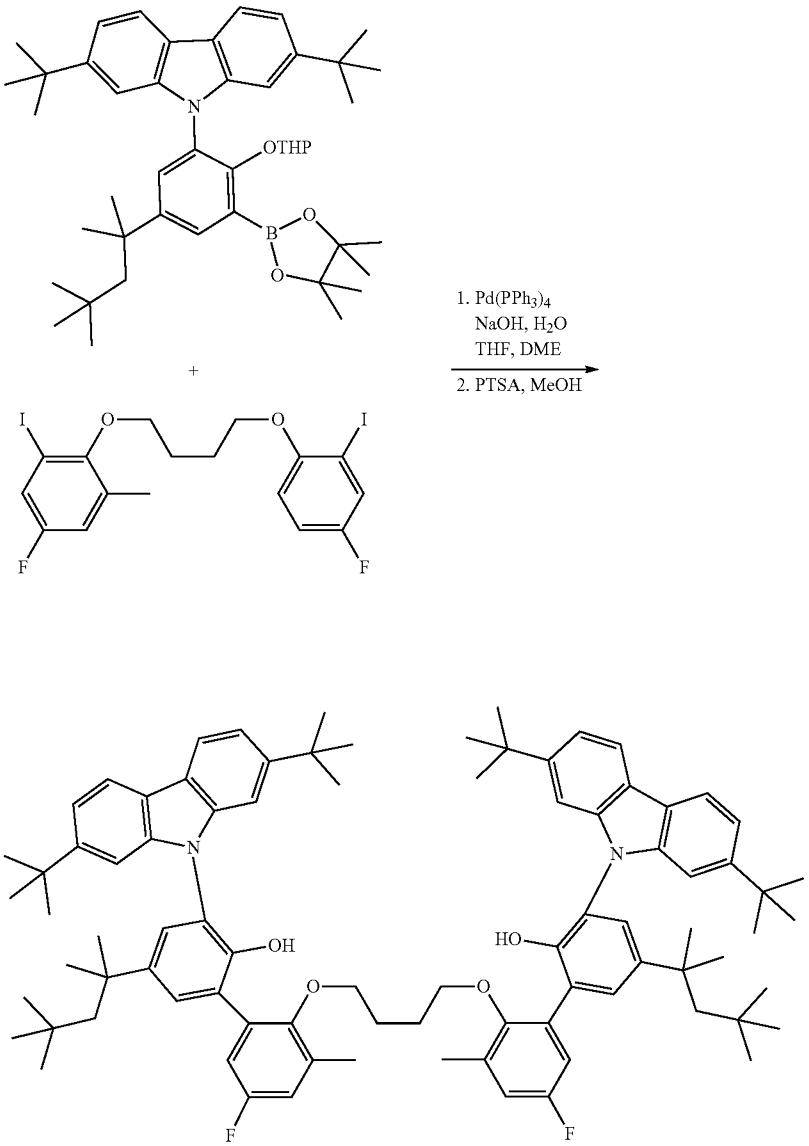

Synthesis of 2',2'''-(butane-1,4-diylbis(oxy))bis(3-(2,7-di-tert-butyl-9H-carbazol-9-yl)-5'-fluoro-3'-methyl-5-(2,4,4-trimethylpentan-2-yl)-[1,1'-biphenyl]-2-ol): To 65 ml of dimethoxyethane was added 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazol-9-yl (3.98 g, mmol), 1,4-bis(4-fluoro-2-iodo-6-methylphenoxy)butane (1.44 g, mmol), sodium hydroxide (0.67 g, mmol), water (19 mL) and THF (22 mL). The system was sparged with nitrogen and then tetrakis(triphenylphosphine)palladium(0) (170 mg, mmol) was added then heated to 85 °C for 48 hours then cooled and concentrated. The residue was taken up in methylene chloride (200 mL), washed with brine (200 mL), dried over anhydrous magnesium sulfate, filtered through a silica plug and concentrated to give crude ligand as an orange oil. To the crude protected ligand was added 100 mL of 1:1 methanol/THF and approximately 100 mg (0.5257 mmol) of p-toluenesulfonic acid monohydrate. The solution was heated to 60 C for 8 hours then cooled and concentrated. The residue was taken up in methylene chloride (200 mL), washed with brine (200 mL), dried over anhydrous magnesium sulfate, filtered through a pad of silica gel then concentrated to afford 3.93 g of an off-white powder. This compound was purified by flash chromatography using an ISCO purification system eluting with 2% ethyl acetate in hexanes to afford 2.65 g (82.9%) of pure compound as a white powder.

$^1H$ NMR (400 MHz, Chloroform-d) δ 8.01 (dd, J=8.2, 0.6 Hz, 4H), 7.44 (s, 4H), 7.31 (dd, J=8.3, 1.7 Hz, 4H), 7.08 (dd, J=1.7, 0.6 Hz, 4H), 7.05-6.98 (m, 2H), 6.92-6.85 (m, 2H), 6.40 (s, 2H), 3.50-3.41 (m, 4H), 2.04 (s, 6H), 1.76 (s, 4H), 1.49-1.44 (m, 4H), 1.41 (s, 12H), 1.30 (s, 36H), 0.81 (s, 18H). $^{13}C$ NMR (101 MHz, Chloroform-d) δ 160.07, 157.65, 150.00, 149.97, 148.96, 147.84, 142.82, 141.71, 133.61, 133.53, 133.00, 132.92, 129.06, 127.53, 126.41, 126.40, 125.20, 121.02, 119.48, 117.66, 117.23, 117.01, 116.12, 115.89, 106.21, 73.51, 57.15, 38.25, 35.04, 32.50, 31.90, 31.75, 31.69, 26.45, 16.42. Multiplicities due to carbon-fluorine coupling were not identified. $^{19}F$ NMR (376 MHz, Chloroform-d) δ −118.80 (t, J=8.5 Hz).

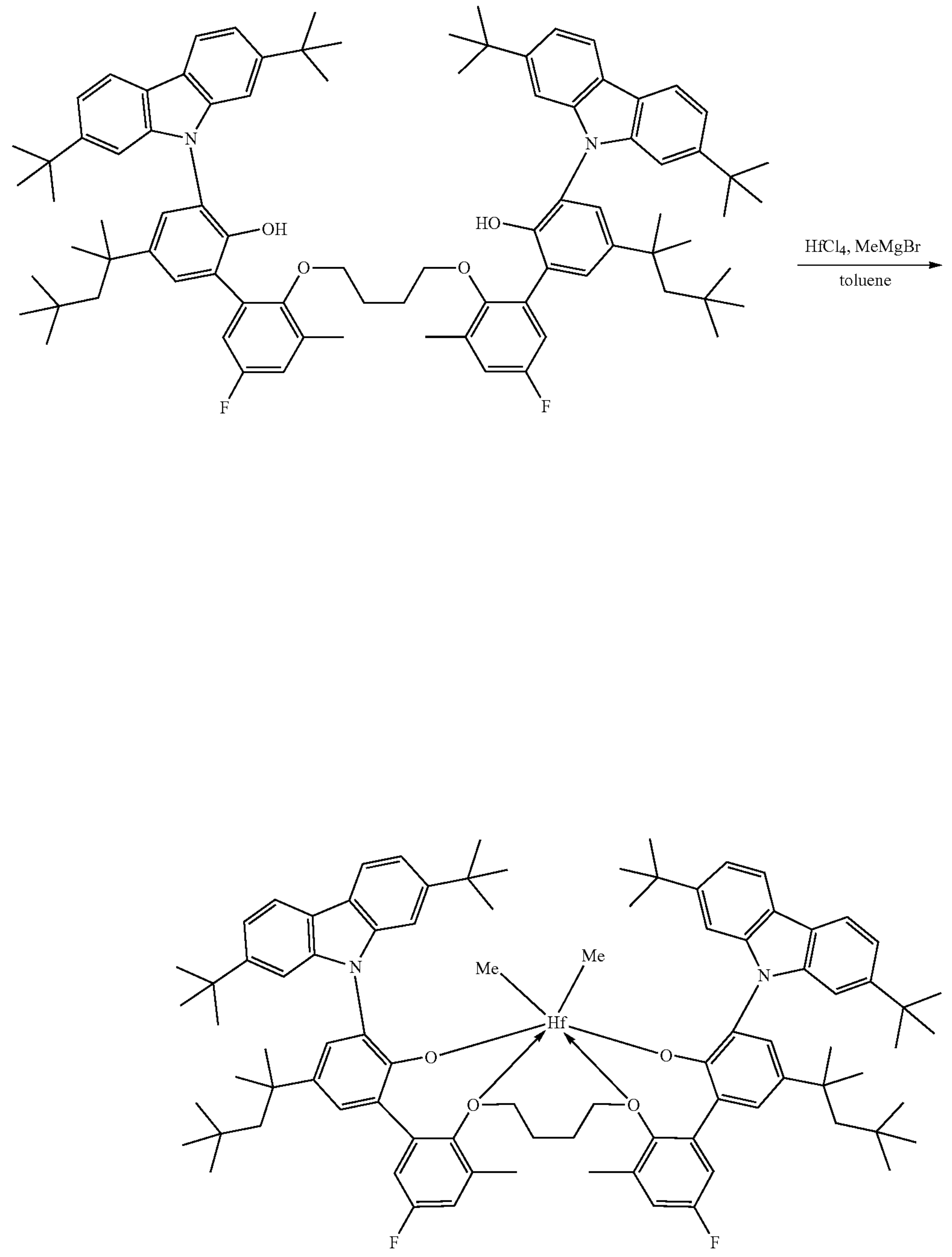

Synthesis of structure (iii): Reaction was set up in a glove box under nitrogen atmosphere. Ajar was charged with hafnium tetrachloride (0.080 g, 0.25 mmol) and toluene (15 mL). The slurry mixture was cooled to −25 °C in the glove box freezer. To the stirring slurry cool mixture was added 3.0 M methylmagnesium bromide in diethyl ether (0.34 mL, 1.02 mmol). The mixture was stirred strongly for about 4 minutes. The solid went in solution and it turned pale yellow. To the mixture was added the ligand (0.30 g, 0.24 mmol) as a solid. The resulting mixture was stirred at room temperature for 2.5 hours. To the mixture was then added hexane (15 mL) and filtered. The light yellow solution was concentrated under vacuum to afford 0.39 g of the product as a brown color solid. To the solid was added hexanes (10 mL) and the mixture was stirred for 2.5 hours at room temperature. The solid was then collected by filtration. The solid was dried under vacuum to afford 0.33 g (93.8%) of the product as an off-white color solid.

$^1$H NMR (400 MHz, Toluene-$d_8$) δ 8.14 (d, J=8.2 Hz, 2H), 8.02 (d, J=8.3 Hz, 2H), 7.87 (d, J=1.6 Hz, 2H), 7.79 (d, J=2.5 Hz, 2H), 7.67 (d, J=1.6 Hz, 2H), 7.45 (dd, J=8.3, 1.6 Hz, 2H), 7.37-7.31 (two m, 4H), 6.83 (dd, J=8.9, 3.2 Hz, 2H), 6.08 (dd, J=8.3, 3.2 Hz, 2H), 3.95 (t, J=9.8 Hz, 2H), 3.50-3.40 (m, 2H), 1.74 (d, J=14.4 Hz, 2H), 1.58 (d, J=14.5 Hz, 2H), 1.54 (s, 16H), 1.23 (d, J=5.9 Hz, 36H), 1.01 (s, 6H), 0.86 (s, 18H), −0.78 (s, 6H).

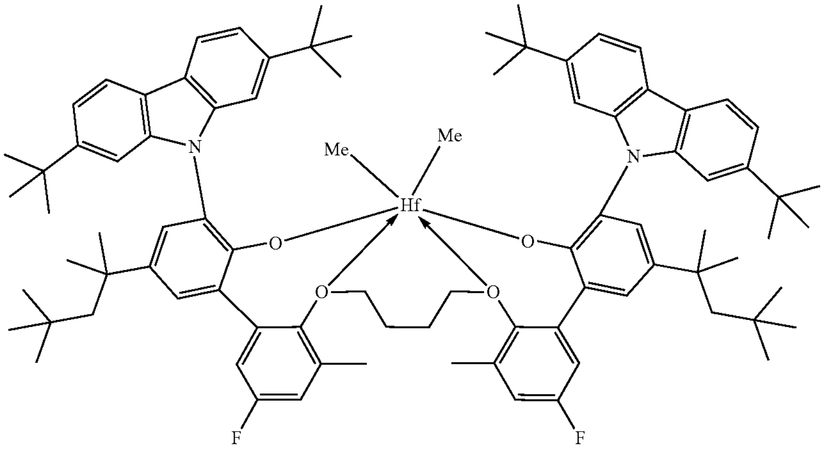

(iii)

The biphenylphenol polymerization precatalyst of Example 4 (EX4) was prepared as follow:

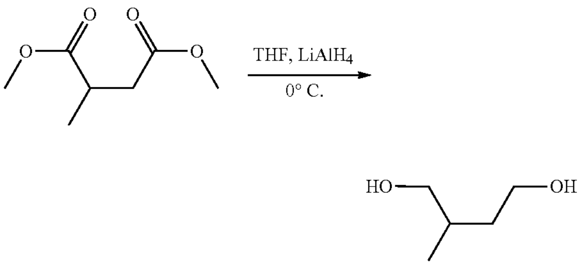

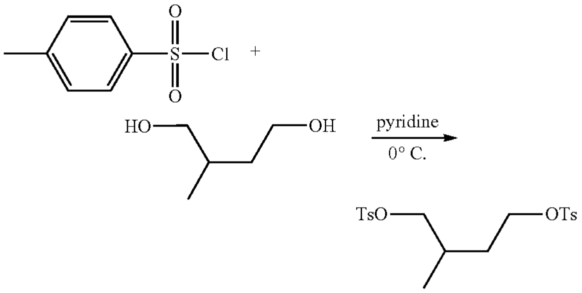

Synthesis of 2-methylbutane-1,4-diol: In a nitrogen filled glovebox, a three-necked round bottom flask equipped with a stir bar and septa was charged with 2.0 M lithium aluminum hydride in tetrahydrofuran (109 mL, 217.72 mmol) and tetrahydrofuran (240 mL). The flaks was sealed and was taken out of the glovebox to the hood. The flaks was equipped with a nitrogen gas inlet. The solution was cooled to 0 °C (ice water bath). A solution of dimethyl 2-methylsuccinate (9.00 g, 56.19 mmol) in tetrahydrofuran (70 mL) was added slowly via syringe to the cooled solution. The resulting mixture was stirred for 17 hours at room temperature. The mixture was cooled to 0 °C (ice water bath) and the excess lithium aluminum hydride was quenched by successive addition of water (4.1 mL), 10% aqueous sodium hydroxide solution (8.4 mL), and water (12.6 mL). The mixture was then stirred for 3 hours at room temperature, filtered. The solids were washed with diethyl ether. The filtrate was dried over magnesium sulfate, filtered, and concentrated by rotary evaporation to afford a crude yellow oil with precipitates. The oil was dried under high vacuum to afford 3.41 g (58.3%) of the product as a yellow oil with precipitates.

$^{1}H$ NMR (400 MHz, Chloroform-d) δ 4.69 (p, J=5.1 Hz, 1H), 3.70 (dq, J=9.5, 5.0 Hz, 0H), 3.60 (tt, J=7.6, 4.3 Hz, 0H), 3.48 (dt, J=9.8, 4.6 Hz, 0H), 3.37 (ddd, J=10.7, 7.1, 3.6 Hz, 0H), 1.76 (heptd, J=6.8, 5.0 Hz, 0H), 1.62 (dddd, J=14.6, 8.0, 6.6, 5.6 Hz, 0H), 1.48 (dtd, J=14.1, 6.0, 5.2 Hz, 0H), 0.91 (d, J=6.8 Hz, 1H). $^{13}C$ NMR (101 MHz, Chloroform-d) δ 67.62, 60.34, 37.00, 33.53, 16.98.

Synthesis of 2-methylbutane-1,4-diyl bis(4-methylbenzenesulfonate): A three-necked round bottom flask equipped with a stir bar, septa, and a nitrogen gas inlet was charged with p-toluenesulfonyl chloride (15.06 g, 78.99 mmol) and anhydrous pyridine (26 mL). The solution was cooled to 0 °C (ice water bath). A solution of 2-methylbutane-1,4-diol (3.41 g, 32.70 mmol) in anhydrous pyridine (6.5 mL) was dropwise added via syringe. The resulting mixture was stirred for 5 hours at 0 °C (ice water bath). The reaction was poured into a beaker of stirred ice water (65 mL) forming a thick peach colored oil phase at the bottom. The phases were separated. The aqueous phase was extracted with dichloromethane (3x65 mL portions). The combined organic phase was washed with water (25 mL), 10 wt. % sulfuric acid (25 mL), 1 M sodium carbonate, then water (25 mL). The organic phase was dried over magnesium sulfate, filtered, and concentrated by rotary evaporation to afford a crude peach oil with precipitates. To remove excess pyridine, the oil was dissolved in dichloromethane, washed with 10 wt. % sulfuric acid (25 mL), then water (25 mL). The organic phase was dried over magnesium sulfate, filtered, and concentrated by rotary evaporation to afford a crude peach oil with precipitates. The oil was dried under high vacuum to afford 8.89 g (65.9%) of the product as a peach oil with precipitates. $^{1}H$ NMR (500 MHz, Chloroform-d) δ 7.75 (dt, J=8.4, 2.0 Hz, 4H), 7.35 (d, J=7.9 Hz, 4H), 4.08-3.94 (m, 2H), 3.87-3.74 (m, 2H), 2.44 (s, 6H), 1.92 (h, J=6.5 Hz, 1H), 1.79-1.69 (m, 1H), 1.51-1.42 (m, 1H), 0.85 (dd, J=6.8, 1.6 Hz, 3H).

$^{13}C$ NMR (126 MHz, Chloroform-d) δ 144.81, 144.79, 132.62, 132.56, 129.77, 127.64, 73.88, 67.75, 31.57, 29.27, 21.46, 15.70.

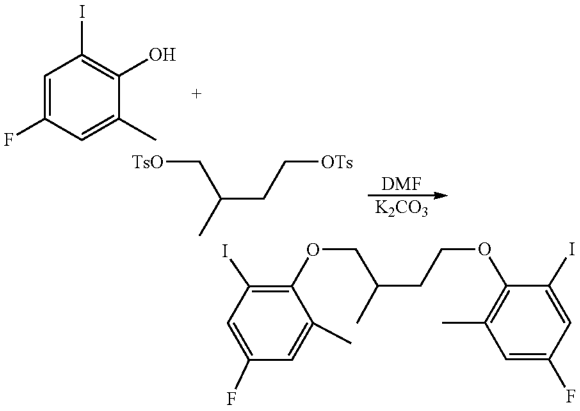

Synthesis of 2,2'-(2-methylbutane-1,4-diyl)bis(oxy))bis (5-fluoro-1-iodo-3-methylbenzene): A three-necked round bottom flask equipped with a stir bar, septa, a condenser, and a nitrogen gas inlet was charged with 2-methylbutane-1,4-diyl bis(4-methylbenzenesulfonate) (3.00 g, 7.27 mmol), 4-fluoro-2-iodo-6-methylphenol (3.67 g, 14.56 mmol, preparation published on US2015/0291713 A1), anhydrous potassium carbonate (4.02 g, 29.08 mmol), and N,N-dimethylformamide (58 mL). The mixture was stirred at 100 °C for 5 hours and was then allowed to cool to room temperature. The mixture was concentrated by rotary evaporation to dryness. The residue was taken up in 50:50 dichloromethane: water (30 mL). The phases were separated. The aqueous phase was extracted with dichloromethane (3×30 mL portions). The combined organic phase was washed with 2N aqueous sodium hydroxide solution (115 mL), water (115 mL), then brine (115 mL). The organic phase was dried over magnesium sulfate, filtered, and concentrated by rotary evaporation to afford a crude reddish-brown oil (4.12 g). The oil was dissolved in a minimal amount of hexanes and was purified by flash column chromatography (ISCO, 220 g silica gel, 5-10% dichloromethane in hexanes). The fractions containing the product were combined and concentrated by rotary evaporation to afford a thick yellow oil. To remove traces of hexanes, the oil was dissolved in dichloromethane and concentrated by rotary evaporation to afford a thick yellow oil (repeated twice). The oil was dried under high vacuum to afford 2.55 g (61.3%) of the product as a thick yellow oil. $^1$H NMR (400 MHz, Chloroform-d) δ 7.30 (ddd, J=7.5, 3.1, 0.7 Hz, 2H), 6.86 (ddt, J=8.7, 3.1, 0.7 Hz, 2H), 3.96 (t, J=6.6 Hz, 2H), 3.79-3.71 (m, 2H), 2.44-2.34 (m, 1H), 2.32 (dt, J=1.5, 0.7 Hz, 6H), 2.25 (dtd, J=13.9, 6.9, 5.6 Hz, 1H), 1.86 (ddt, J=14.0, 7.7, 6.3 Hz, 1H), 1.24 (d, J=6.8 Hz, 3H). $^{13}$C NMR (101 MHz, Chloroform-d) δ 159.57, 159.55, 157.12, 157.09, 153.58, 153.55, 153.23, 153.20, 133.15, 133.12, 133.07, 133.04, 123.50, 123.41, 123.25, 123.17, 118.01, 117.94, 117.79, 117.72, 91.45, 91.35, 91.30, 91.21, 77.46, 77.45, 71.25, 71.23, 33.98, 31.22, 17.36. Multiplicities due to carbon fluorine couplings were not assigned.

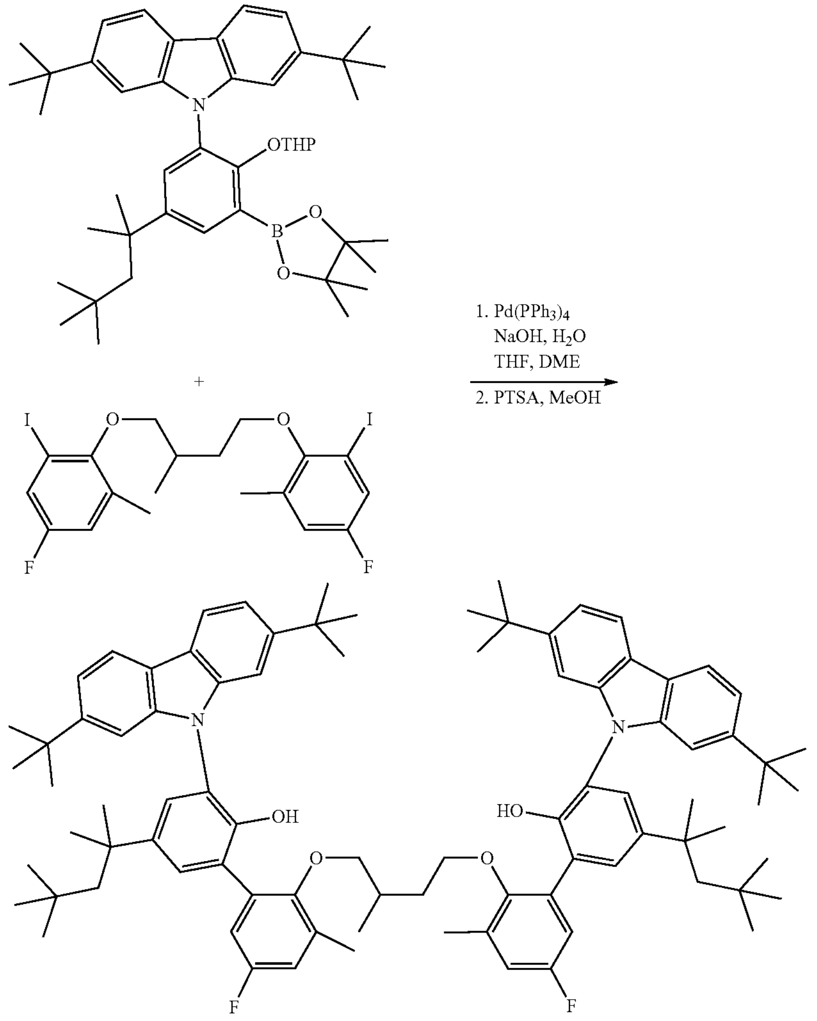

Synthesis of 2',2'''-((2-methylbutane-1,4-diyl)bis(oxy))bis(3-(2,7-di-tert-butyl-9H-carbazol-9-yl)-5'-fluoro-3'-methyl-5-(2,4,4-trimethylpentan-2-yl)-[1,1'-biphenyl]-2-ol): A three-necked round bottom flask equipped with a stir bar, septa, a condenser, and a nitrogen gas inlet was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trim ethylpentan-2-yl)phenyl)-9H-carbazol-9-yl (5.86 g, 8.45 mmol, preparation published on US2015/0291713 A1), 2,2'-(2-methylbutane-1,4-diyl)bis(oxy))bis(5-fluoro-1-iodo-3-methylbenzene) (2.30 g, 4.02 mmol), 1,2-dimethoxyethane (105 mL), tetrahydrofuran (36 mL) and a solution of sodium hydroxide (1.12 g, 27.98 mmol) in water (31 mL). The mixture was purged with nitrogen for 15 minutes, then tetrakis(triphenylphosphine)palladium(0) (0.36 g, 0.31 mmol) was added. The mixture was heated at 85 °C for 20 hours; a precipitation was formed. The reaction was allowed to cool to room temperature and was filtered. The solids were dissolved in dichloromethane and the solution was concentrated by rotary evaporation to afford a brownish-yellow crystalline solid. The solid was dissolved in a mixture of tetrahydrofuran (43 mL), methanol (43 mL), and chloroform (60 mL). The solution was heated to 60 °C and p-toluenesulfonic acid, monohydrate (0.16 g, 0.82 mmol) was added. The reaction was heated at 60 °C overnight and was allowed to cool to room temperature. The reaction was concentrated by rotary evaporation to afford crude a brown crystalline solid. The solid was recrystallized from acetonitrile, filtered and washed with cold acetonitrile (2×10 mL portions). The ligand was dissolved in dichloromethane and concentrated by rotary evaporation to afford a light brown crystalline solid. The solid was dried under high vacuum to afford 4.50 g (87.1%) of the product as a light brown crystalline solid. $^{1}$H NMR (400 MHz, Chloroform-d) δ 8.00 (dt, J=8.3, 2.4 Hz, 4H), 7.46-7.39 (m, 4H), 7.34-7.25 (m, 4H), 7.09 (dt, J=3.7, 1.8 Hz, 4H), 7.00 (dt, J=8.9, 3.3 Hz, 2H), 6.86 (dd, J=8.8, 3.1 Hz, 2H), 6.30 (s, 2H), 3.54 (td, J=9.3, 4.2 Hz, 2H), 3.27 (d, J=5.9 Hz, 2H), 2.05 (s, 3H), 2.01 (s, 3H), 1.74 (s, 4H), 1.67 (m, 1H), 1.39 (d, J=2.8 Hz, 12H), 1.34-1.24 (m, 36H), 1.24-1.09 (m, 2H), 0.81 (s, 9H), 0.80 (s, 9H), 0.56 (d, J=6.6 Hz, 3H). $^{13}$C NMR (101 MHz, cdcl$_3$) δ 160.07, 160.04, 157.65, 157.62, 150.02, 149.99, 149.96, 148.93, 148.90, 148.88, 148.86, 147.74, 147.70, 142.81, 141.62, 141.60, 133.60, 133.51, 133.03, 132.95, 129.01, 127.44, 127.39, 126.51, 126.49, 126.38, 126.36, 125.23, 125.19, 121.05, 121.01, 119.47, 117.68, 117.66, 117.63, 117.35, 117.22, 117.13, 116.99, 116.18, 116.12, 115.95, 115.89, 106.32, 79.01, 71.64, 57.18, 57.13, 38.25, 35.06, 33.34, 32.54, 32.51, 31.96, 31.91, 31.87, 31.79, 31.64, 30.40, 16.45, 16.40. Multiplicities due to carbon fluorine couplings were not assigned.

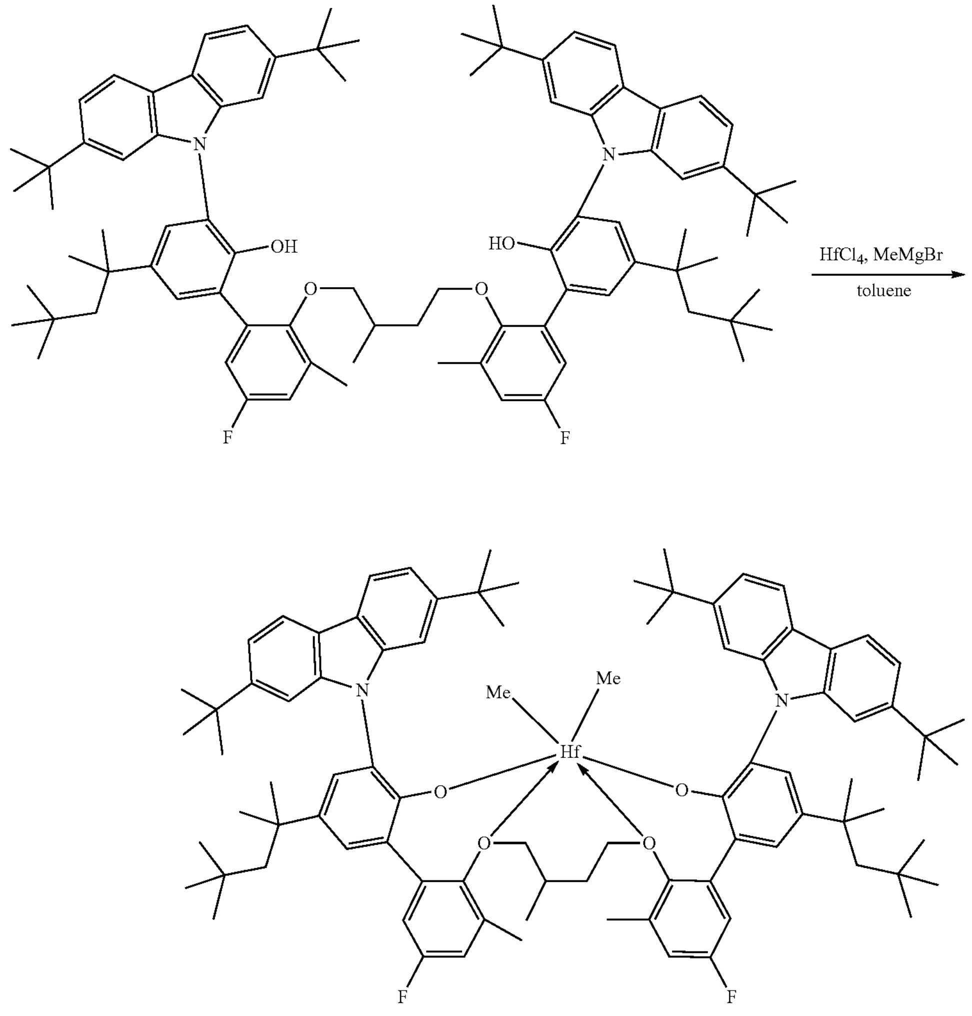

Synthesis of structure (iv): Reaction was set up in a glove box under nitrogen atmosphere. Ajar was charged with hafnium tetrachloride (0.076 g, 0.24 mmol) and toluene (15 mL). The slurry mixture was cooled to −25 °C in the glove box freezer. To the stirring slurry cool mixture was added 3.0 M methylmagnesium bromide in diethyl ether (0.34 mL, 1.02 mmol). The mixture was stirred strongly for about 4 minutes. The solid went in solution and it turned light yellow. To the mixture was added the ligand (0.30 g, 0.23 mmol) as a solid. The resulting mixture was stirred at room temperature for 2 hours. To the mixture was then added hexane (15 mL) and filtered. The solution was concentrated under vacuum to afford 0.35 g of the product as an almost black color solid. To the solid was added hexanes (10 mL) and the mixture was stirred for 2.5 hours at room temperature. Black solids were observed. Therefore toluene was added in 2 mL increments to dissolve most of the solid for a total of 14 mL of toluene. The mixture was filtered through a syringe filter and was concentrated under vacuum to afford 0.28 g of the product as a brown color solid. To the brown solid was added hexanes (10 mL) and the mixture was stirred for 1 hour at room temperature. The mixture was filtered, the solids were placed in a glass vial, and was dried under high vacuum to afford 0.20 g (58.5%) of the product as an off white color solid. $^1$H-NMR of the product showed that it is a mixture of isomers.

$^1$H-NMR (400 MHz, Toluene-$d_8$) δ 8.13 (dd, J=8.3, 1.8 Hz, 4H), 8.07-7.98 (m, 4H), 7.88 (d, J=1.6 Hz, 2H), 7.82 (q, J=1.9 Hz, 3H), 7.76 (td, J=4.6, 4.0, 2.5 Hz, 3H), 7.69 (dd, J=4.3, 1.6 Hz, 3H), 7.64 (d, J=1.6 Hz, 1H), 7.45 (dt, J=8.3, 1.6 Hz, 4H), 7.37 (t, J=2.7 Hz, 1H), 7.36-7.29 (m, 6H), 6.85 (tt, J=11.6, 4.4 Hz, 4H), 6.15-6.01 (m, 4H), 4.17-4.02 (m, 2H), 3.50 (s, 1H), 3.44-3.25 (m, 5H), 1.77 (dd, J=14.4, 4.9 Hz, 1H), 1.73-1.58 (m, 5H), 1.56 (s, 6H), 1.53 (s, 10H), 1.53 (s, 13H), 1.51 (s, 5H), 1.30-1.17 (m, 61H), 1.01-0.95 (m, 10H), 0.88 (d, J=4.9 Hz, 14H), 0.82 (s, 12H), 0.80 (s, 12H), 0.47 (d, J=7.1 Hz, 4H), 0.22 (d, J=6.9 Hz, 2H), −0.70 (d, J=1.5 Hz, 6H), −0.84 (s, 4H), −0.88 (s, 2H). Isomers were not identified and integrations are not normalized per the ratio of protons.

(iv)

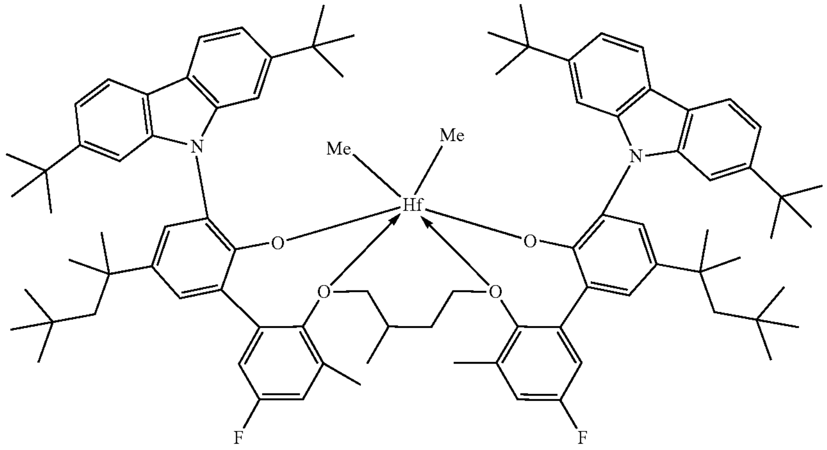

The biphenylphenol polymerization precatalyst of Example 5 (EX5) was prepared using the same ligand (e.g., as illustrated below) as Example 4 (EX4) as follow:

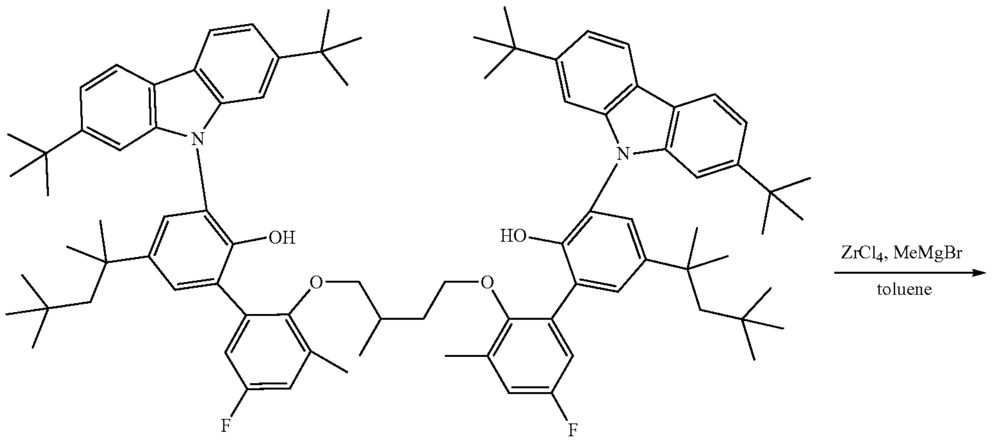

-continued

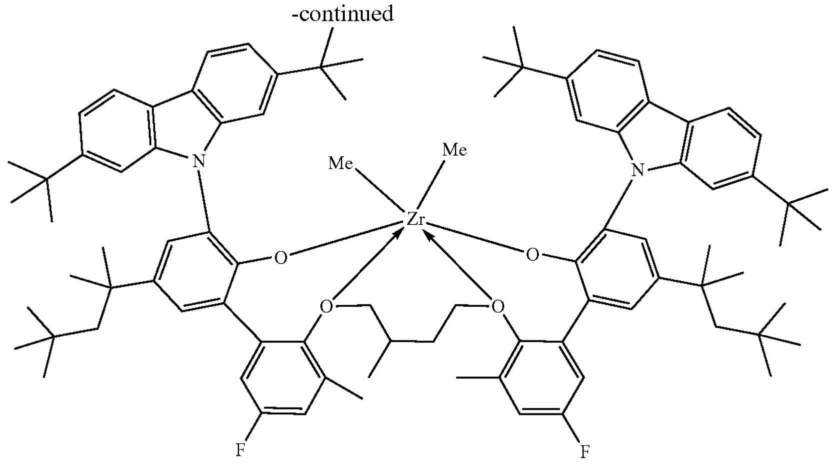

Synthesis of structure (v): Reaction was set up in a glove box under nitrogen atmosphere. A jar was charged with zirconium tetrachloride (0.054 g, 0.23 mmol) and toluene (15 mL). The slurry mixture was cooled to −25 °C in the glove box freezer. To the stirring slurry cool mixture was added 3.0 M methylmagnesium bromide in diethyl ether (0.35 mL, 1.05 mmol). The mixture was stirred strongly for about 4 minutes. The solid went in solution and it turned light yellow. To the mixture was added the ligand (0.30 g, 0.23 mmol) as a solid. The resulting mixture was stirred at room temperature for 2 hours. To the mixture was then added hexane (15 mL) and filtered. The solution was concentrated under vacuum to afford 0.36 g of the product as an almost black color solid. To the solid was added hexanes (15 mL) and the mixture was stirred for 4 hours at room temperature. Black solids were observed. The mixture continued to stir for 2 days at room temperature. To the mixture was added toluene in 2 mL increments to dissolve most of the solid for a total of 16 mL of toluene. The mixture was filtered through a syringe filter and was concentrated under vacuum to afford 0.29 g of the product as a brown color solid. To the brown solid was added hexanes (10 mL) and the mixture was stirred overnight at room temperature. The mixture was filtered, the solids were placed in a glass vial, and was dried under high vacuum to afford 0.19 g (56.6%) of the product as an off white color solid. $^1$H-NMR of the product showed that it is a mixture of isomers.

$^1$H-NMR (500 MHz, Benzene-$d_6$) δ 8.19 (m, 5H), 8.12 (d, J=8.0 Hz, 5H), 7.95-7.82 (m, 11H), 7.79 (s, 4H), 7.53-7.45 (m, 6H), 7.43-7.32 (m, 10H), 6.99-6.86 (m, 6H), 6.09 (s, 5H), 4.03-3.91 (m, 3H), 3.49 (t, J=9.9 Hz, 1H), 3.36-3.20 (m, 7H), 1.89-1.61 (m, 6H), 1.57 (s, 13H), 1.53 (d, J=4.7 Hz, 41H), 1.27 (d, J=2.6 Hz, 34H), 1.25-1.15 (m, 32H), 1.05 (d, J=6.8 Hz, 6H), 1.00 (d, J=10.7 Hz, 9H), 0.90 (s, 22H), 0.84 (d, J=3.5 Hz, 32H), 0.44 (d, J=7.1 Hz, 6H), 0.17 (d, J=7.1 Hz, 3H), −0.36 (d, J=3.7 Hz, 8H), −0.46 (s, 5H), −0.54 (s, 3H). Isomers were not identified and integrations are not normalized per the ratio of protons.

(v)

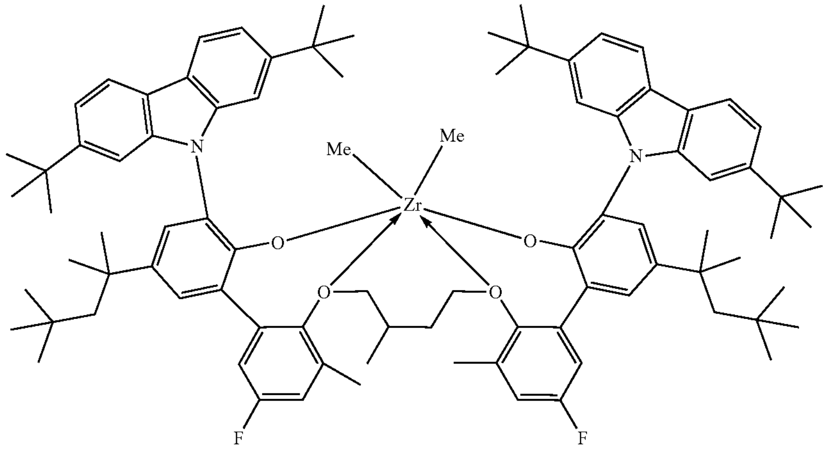

The biphenylphenol polymerization precatalyst of Comparative Example 1 (CE1) preparation was reported on U.S. Pat. No. 9,751,998 B2, and the entire contents of U.S. Pat. No. 9,751,998 B2 are incorporated herein by reference.

(vi)

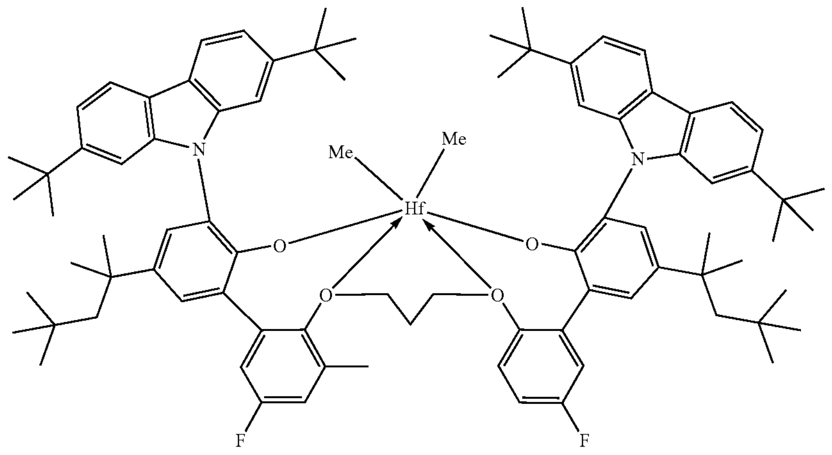

The biphenylphenol polymerization precatalyst of Comparative Example 2 (CE2) was prepared using the same ligand as Comparative Example 1 (reported in U.S. Pat. No. 9,751,998 B2) as follow:

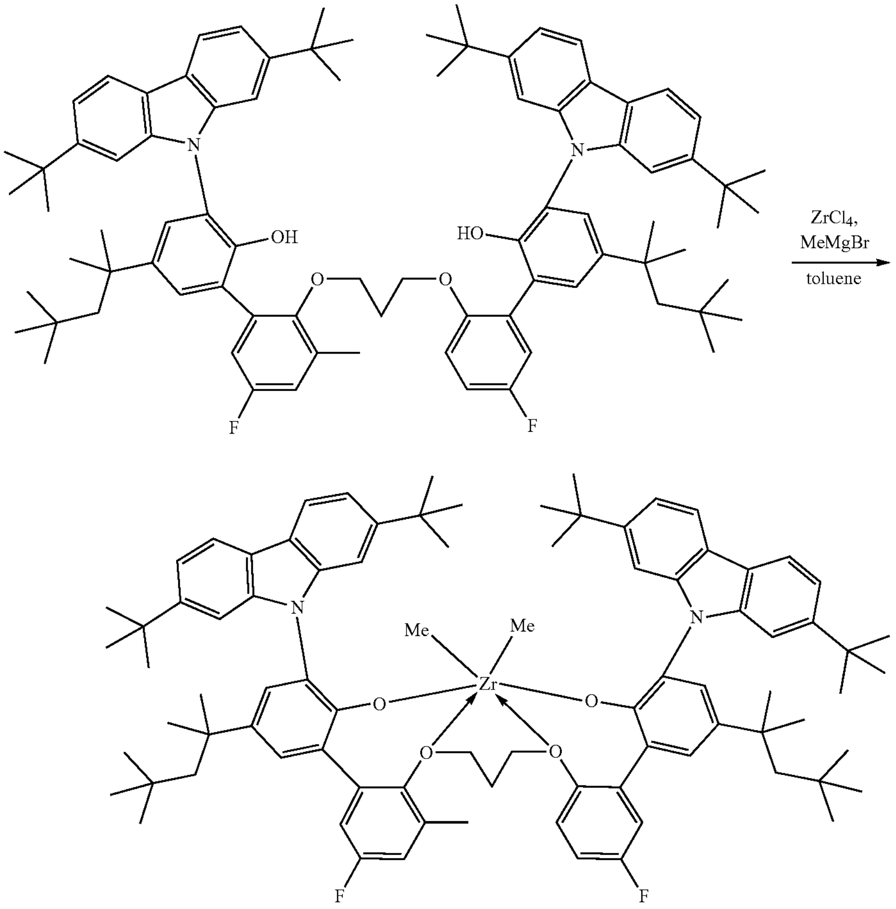

Reaction was set up in a glove box under nitrogen atmosphere. A jar was charged with $ZrCl_4$ (0.0930 g, 0.3991 mmol) and toluene (30 mL). The slurry mixture was cooled to −25 C. Then to the stirring slurry was added 3.0 M methylmagnesium bromide in diethyl ether (0.6 mL, 1.8 mmol). The mixture was stirred strongly for about 3 minutes. The solid went in solution and it turned light brown. To the mixture was added the ligand (0.5052 g, 0.4068 mmol)

as a solid. The mixture was stirred at room temperature for 2.5 hours. To the mixture was then added hexane (30 mL) and filtered to afford a colorless solution. The solution was concentrated under vacuum overnight to afford 0.6152 g of the product. Excess yield was attributed to high conversion and presence of solvent. $^1$H-NMR of the solid showed the desired complex in acceptable purity.

$^1$H NMR (400 MHz, Benzene-$d_6$) δ 8.20 (d, J=8.2 Hz, 1H), 8.14 (d, J=8.2 Hz, 2H), 8.02 (d, J=8.3 Hz, 1H), 7.94 (d, J=1.7 Hz, 1H), 7.80 (t, J=1.7 Hz, 2H), 7.77 (d, J=1.6 Hz, 1H), 7.71-7.64 (m, 2H), 7.49-7.31 (m, 6H), 7.23 (d, J=2.4 Hz, 1H), 6.95 (ddd, J=14.1, 8.8, 3.2 Hz, 2H), 6.20 (ddd, J=8.8, 7.4, 3.1 Hz, 1H), 6.14 (dd, J=8.4, 3.1 Hz, 1H), 5.72 (dd, J=8.9, 5.0 Hz, 1H), 3.74 (ddd, J=10.4, 7.8, 3.0 Hz, 1H), 3.52 (ddd, J=9.7, 6.8, 2.4 Hz, 1H), 3.46 (ddd, J=9.9, 7.0, 3.4 Hz, 1H), 3.18 (ddd, J=10.6, 8.4, 2.3 Hz, 1H), 1.74 (d, J=14.5 Hz, 1H), 1.67-1.58 (m, 2H), 1.57-1.47 (m with a s, 11H), 1.46-1.43 (m, 12H), 1.42 (s, 3H), 1.26 (s, 27H), 1.20 (d, J=3.4 Hz, 6H), 0.90 (s, 9H), 0.85 (s, 3H), 0.81 (s, 9H), −0.48 (s, 3H), −0.89 (s, 3H).

(vii)

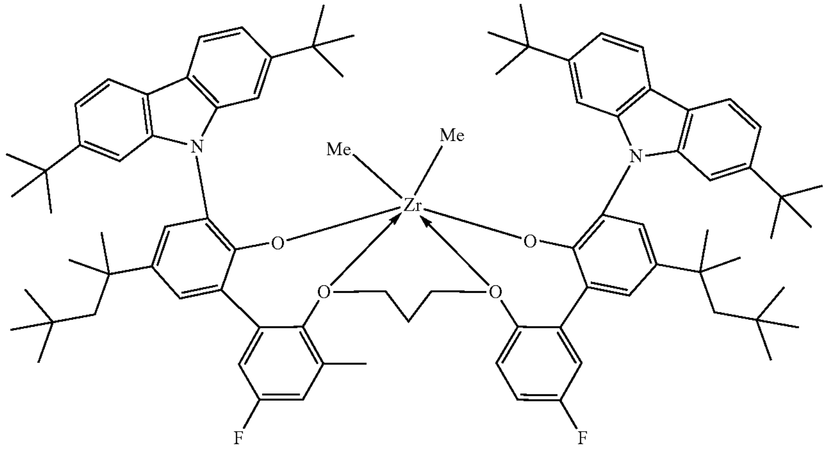

The polymerization precatalyst of Comparative Example 3 (CE3) preparation is reported in U.S. Pat. No. 9,751,998 B2.

(viii)

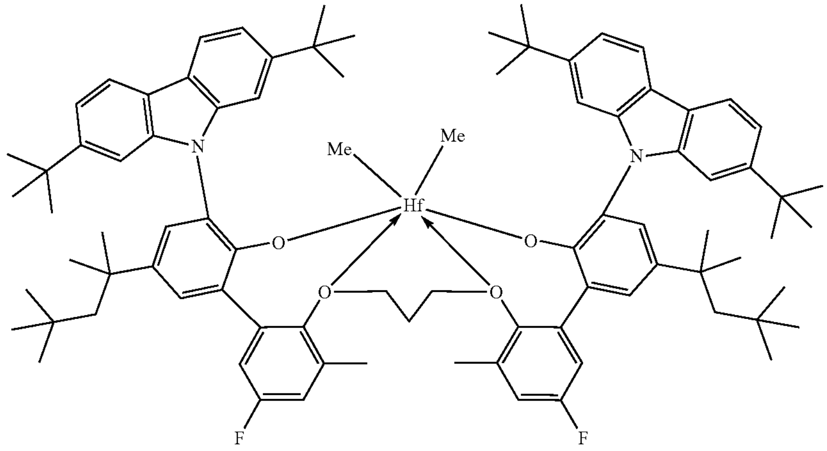

The biphenylphenol polymerization precatalyst of Comparative Example 4 (CE4) preparation is reported in US patent application number 2016/0108156 A1, and the entire contents of 2016/0108156 A1 are incorporated herein by reference.

(ix)

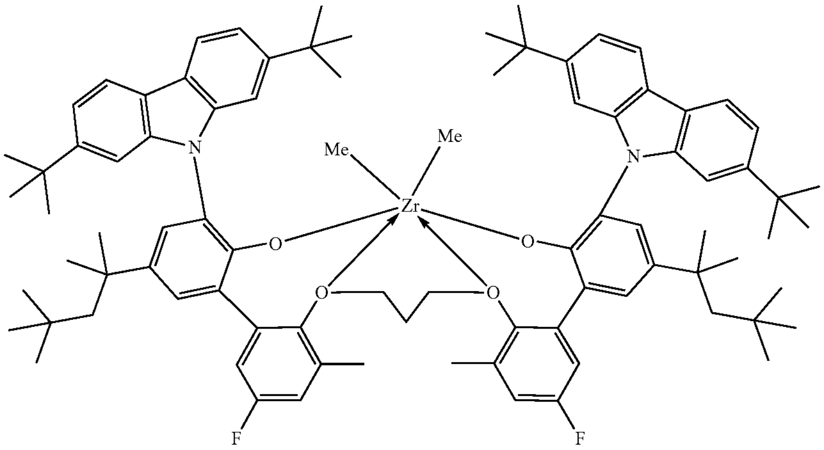

The activated biphenylphenol polymerization catalysts of Examples 1-5 and Comparatives Examples of 1-4 were conventionally supported for slurry-phase polymerization as follows.

General procedure for biphenylphenol polymerization catalyst preparation—supporting reaction of biphenylphenol polymerization precatalyst onto SMAO: All work is performed in a nitrogen purge box on Core Module 3 (CM3) high throughput unit. Prior to starting the experiment, biphenylphenol polymerization precatalyst stock solutions were prepared to the desired concentration in toluene. To each reaction vial, the desired amount of SMAO was manually weighed to reach 45 μmol catalyst per 1 g SMAO (about 1:108 equivalent ratio) and added along with the tumble stir disc. Toluene was dispensed by the CM3, followed by the desired amount of biphenylphenol polymerization precatalyst stock solution. Certain biphenylphenol polymerization precatalyst stock solutions were delivered by hand, due to the limited volume of solution available. After adding all the reaction components, the vials were capped, stirred to 300 rpm and heated to 50 °C. After 30 minutes, the vials were cooled to room temperature, caps removed and the reaction plate placed in a CM3 vortexing deck position. Reaction vials were allowed to mix with vortexing at 800 rpm for 3 minutes, allowing homogeneous slurry to form. The desired amount of each supported biphenylphenol polymerization catalyst slurry was then daughtered in into 8 mL vials and diluted with Isopar E. When multiple daughter samples were required, a new PDT tip was utilized for each subsequent daughtering step. Reactions were daughter to the desired concentration for the PPR.

Slurry-phase ethylene/1-hexene copolymerizations of Examples 1-5 along with Comparative Examples 1-4 were conducted as follows.

General Parallel Pressure Reactor (PPR) procedure for slurry-phase polymerization: All and PPR solutions were prepared in an inert atmosphere glove box under nitrogen. Isopar E, ethylene, and hydrogen was purified by passage through 2 columns, the first containing A2 alumina and the second containing Q5 reactant. The 48 PPR-A reactor cells were prepared the weekday prior to the actual PPR run as follows: A tared library of glass tubes were manually inserted into the reactor wells, the stirrer paddles attached to the module heads, and the module heads attached to the module bodies. The reactors were heated to 150 °C, purged with nitrogen for 10 hours, and cooled to 50 °C. On the day of the experiment, the reactors were purged twice with ethylene and vented completely to purge the lines. The reactors were then heated to 50 °C and the stirrers turned on at 400 rpm. The reactors were filled to the appropriate solvent level with Isopar-E using the robotic needle to give a final reaction volume of 5 mL. The solvent injections to modules 1-3 were performed using the left robotic arm and the solvent injections to modules 4-6 used the right robotic arm with both arms operating simultaneously. Following solvent injection, the reactors were heated to final desired temperature and stirring increased to the set points programmed in the Library Studio design. When the reactors reached the temperature set point, which required about 10-30 minutes depending on the desired temperature, the cells were pressurized to the desired set point with either pure ethylene or a mixture of ethylene and hydrogen from the gas accumulator and the solvent saturated (as observed by the gas uptake). If an ethylene-hydrogen mixture was used, once the solvent was saturated in all cells, the gas feed line was switched from the ethylene-hydrogen mixture to pure ethylene for the remainder of the run. The robotic synthesis protocol was then initiated whereby the comonomer solution (1-hexene) was injected first, followed by the scavenger solution (SMAO), and finally the biphenylphenol polymerization catalyst solutions in Isopar-E. All of the injections to modules 1-3 were performed using the left robotic arm and the injections to modules 4-6 used the right robotic arm with both arms operating simultaneously. All three injections for a given cell completed before the robot started the injection of the next cell in the sequence. Each reagent addition was chased with 500 μl of Isopar-E solvent to ensure the complete injection of the reagent. After each reagent addition, the needles were washed with Isopar-E inside and outside the needle. At the moment of the biphenylphenol polymerization catalyst injection in each individual cell, the reaction timer was started. The polymerization reactions proceeded for 60-180 minutes or to the set ethylene uptake of 60-180 psi, whichever occurred first, and then were quenched by adding a 40 psi overpressure of 10%

(v/v) CO2 in argon. Data collection continued for 5 minutes after the quench of each cell. The reactors were cooled down to 50 °C, vented, and the PPR tubes removed from the module blocks. The PPR library was removed from the drybox and the volatiles then removed using the Genevac rotary evaporator. Once the library vials were re-weighed to obtain the yields, the library was submitted for analytical.

Gas-phase ethylene/1-hexene copolymerizations of the biphenylphenol polymerization catalyst of Example 2 and the catalyst of Comparative Example 2 were also conducted in the gas-phase in a 2 liter (L) semi-batch autoclave polymerization reactor equipped with a mechanical agitator as follows. The reactor was first dried for 1 hour, charged with 200 g of sodium chloride (NaCl) and dried by heating at 100 °C under nitrogen for 30 minutes. After drying, 5 g of silica supported methylaluminoxane (SMAO) was introduced as a scavenger under nitrogen pressure. After adding the SMAO, the reactor was sealed and components were stirred. The reactor was then charged with hydrogen ($H_2$ preload, as indicated below for each of B-condition and K-condition) and hexene ($C_6/C_2$ ratio, as indicated below for each of B-conditions and K-conditions), then pressurized with ethylene at 100 pounds per square inch (psi). Once the system reached a steady state, the type and amount of respective activated biphenylphenol polymerization catalyst for each of EX2 and CE2 was charged into the reactor at 80 °C to start polymerization for each of the catalysts of EX2 and CE2. The reactor temperature was brought to 100 °C and set at this temperature throughout the 1 hour run. The runs were conducted at B-Conditions or K-Conditions, as identified in Table 1 and detailed below. At the end of the run, the reactor was cooled down, vented and opened. The resulting product mixture was washed with water and methanol, then dried.

The results for EX1-5 and CE1-4 are shown in Tables 1 and 2.

Induction time (seconds): was determined by measuring an instantaneous polymerization rate (e.g., an instantaneous polymerization rate of ethylene) and time of reaction to identify the induction time as an amount of time it takes for ⅔ of the peak instantaneous ethylene polymerization rate to develop, as determined by least squares fit of a first-order exponential for the rate of increase of the instantaneous ethylene polymerization rate for each catalyst.

Mn (number average molecular weight) and Mw (weight average molecular weight), z-average molecular weight (Mz) were determined by gel permeation chromatography (GPC), as is known in the art.

Comonomer percent (i.e., 1-hexene) incorporated in the polymers (weight %) was determined by rapid FT-IR spectroscopy on the dissolved polymer in a GPC measurement.

B-conditions as follows: Temperature=100 °C; Ethylene=100 pounds per square inch (psi); $H_2/C_2$=0.0017; $C_6/C_2$=0.4.

K-conditions are as follows: Temperature=100 °C; Ethylene=100 psi; H2/$C_2$=0.0068; $C_6/C_2$=0.4 (or where indicated by * $C_6/C_2$=0.17).

Polydispersity index (PDI): refers to a measure of the distribution of molecular mass in a given polymer sample. The polydispersity index is calculated by dividing the Mw by the Mn.

Initial Reactor temperature increase (degrees Celsius): was determined for the biphenylphenol polymerization catalyst and conditions in Table 1 in accordance with the polymerization testing described herein, for the first 500 second of the polymerization reaction for a given amount of biphenylphenol polymerization catalyst (nmol; as indicated in Table 1).

TABLE 1

| | Precatalyst structure | Oxalate bride (L) | M | Slurry-Phase Induction Time (s) B-Conditions | K-Conditions | Gas-Phase Initial reactor temperature increase (degrees Celsius) B or K conditions |
|---|---|---|---|---|---|---|
| CE1 | vi | C3 alkyl | Hf | 5 | 10 | BDL |
| EX1 | i | C4 alkyl | Hf | 100 | 5 | BDL |
| CE2 | vii | C3 alkyl | Zr | <10 | <10 | >10 |
| EX2 | ii | C4 alkyl | Zr | 100 | 210 | <3 |
| CE3 | viii | C3 alkyl | Hf | 20 | <10 | NT |
| EX3 | iii | C4 alkyl | Hf | 40 | 90 | NT |
| EX4 | iv | C4 alkyl | Hf | 50 | 10 | NT |
| CE4 | ix | C3 alkyl | Zr | <10 | <10 | NT |
| EX5 | v | C4 alkyl | Zr | 70 | 80 | NT |

TABLE 2

| | Catalyst nmol | Condition | Mn | Mw | Mz | PDI | Comonomer % |
|---|---|---|---|---|---|---|---|
| | Slurry-phase | | | | | | |
| CE 1 | 15.5 | B | 88,206 | 337,377 | 939,480 | 3.8 | 2.3 |
| EX 1 | 31 | B | 195,302 | 976,971 | 2,322,675 | 5.0 | 1.6 |
| CE 3 | 23.2 | B | 24,751 | 198,200 | 619,116 | 8.2 | 2.5 |
| EX 3 | 23.2 | B | 220,806 | 1,007,349 | 2,282,210 | 4.7 | 2.6 |
| EX 4 | 31 | B | 93,576 | 607,106 | 1,483,464 | 7.1 | 1.97 |
| CE 2 | 3.1 | B | 55,167 | 198,534 | 682,385 | 3.6 | 4.8 |
| EX 2 | 4.7 | B | 130,777 | 689,174 | 2,149,603 | 5.3 | 1.4 |
| CE 4 | 6.2 | B | 11,256 | 77,118 | 276,105 | 7.2 | 2.0 |
| EX 5 | 6.2 | B | 32,731 | 250,103 | 769,719 | 11.3 | 2.2 |
| CE 1 | 15.5 | K | 43,782 | 206,451 | 585,759 | 4.7 | 4.8 |
| EX 1 | 31 | K | 89,085 | 344,227 | 455,856 | 5.0 | 1.0* |
| CE 3* | 23.2 | K* | 24,112 | 200,933 | 622,994 | 8.8 | 0.4* |
| EX 3 | 31 | K | 98,558 | 837,866 | 1,934,138 | 10.4 | 3.4 |
| EX 4 | 31 | K | 73,441 | 697,302 | 1,855,434 | 10.9 | 2.5 |
| CE 2 | 3.1 | K | 26,026 | 123,999 | 416,474 | 4.8 | 5.3 |
| CE 2* | 6.2 | K* | 25,470 | 160,407 | 613,960 | 6.3 | 2.8* |
| EX 2* | 6.2 | K* | 42,521 | 370,735 | 954,461 | 9.8 | 2.0* |
| CE 4* | 6.2 | K* | 8,344 | 87,694 | 391,861 | 10.6 | 0.3* |
| EX 5 | 6.2 | K | 47,622 | 322,775 | 880,375 | 7.6 | 1.1 |

"NT" the test was not conducted. "BDL" refers to a value that is below the detection limit.

As detailed in Tables 1 and 2, EX1-5 provide for biphenylphenol polymerization catalysts made from the biphenylphenol polymerization precatalysts of Formula I. Such biphenylphenol polymerization catalysts exhibit improved (longer) kinetic induction times, and yet provide resultant polymers having suitable properties such as an improved (higher) molecular weight. The improved (longer) induction times are realized in both gas-phase delivery (EX2 biphenylphenol polymerization catalyst employed in both the gas-phase and slurry-phase) and slurry-phase delivery (EX1-5 in slurry-phase). For instance, the kinetic induction times of the biphenylphenol polymerization catalysts can be at least 40 seconds. That is, the biphenylphenol polymerization catalysts of the disclosure can have a kinetic induction times that are least 50 percent longer or at least 40 percent longer than the comparative catalysts. Thus, biphenylphenol polymerization catalysts herein provide a chemical mechanism (as opposed to other approaches that may rely on a physical mechanism such as coating on a catalyst) to realize improved (longer) induction times. Without wishing to be bound by theory, it is believed that the oxalate bride (L of Formula I) being a saturated $C_4$ alkyl in combination with the particular $R^7$ and $R^8$ groups (e.g., wherein at least one of $R^7$ and $R^8$ comprises a $C_1$ to $C_{20}$ alkyl, aralkyl, hydrogen and/or halogen) together are at least in part responsible for the improved (longer) induction times as compared to catalysts with other structures such as those in CE1-4 which employ catalyst structures having a $C_3$ oxalate bridge and/or lack the particular $R^7$ and $R^8$ groups.

The improved (longer) kinetic induction times of the biphenylphenol polymerization catalysts made from the biphenylphenol polymerization precatalysts of Formula I act to moderate thermal behavior of the polymerization reactor during polymerization. This is evidenced by CE2 which exhibited an initial temperature increase (i.e., exotherm) of greater than ten degrees Celsius from a reactor temperature setpoint (100 degree Celsius), whereas EX2 exhibited less than three degrees Celsius change under the same B-conditions in the gas-phase. Without wishing to be bound by theory it is believed that the moderated thermal behavior of the biphenylphenol polymerization catalysts made from the biphenylphenol polymerization precatalysts of Formula I improves operability by mitigating any sticking, sheeting, melting, agglomeration and/or variance in resin particle size, and yet provides resultant polymers with desired properties such as Mn, Mz, PDI, and/or Comonomer %. For instance, the biphenylphenol polymerization catalysts of the disclosure can make higher molecular weight polymers than polymers from the comparative catalysts. For example, at Condition B, CE1 and CE3 had molecular weights of 337,377 and 198,200, respectively, as compared to the molecular weights of 976,971, 1,007,349, and 607,106 for EX1, EX3, and EX4, respectively.

What is claimed is:

1. A biphenylphenol polymerization precatalyst selected from a group consisting of the structures of (iv), and (v);

(iv)

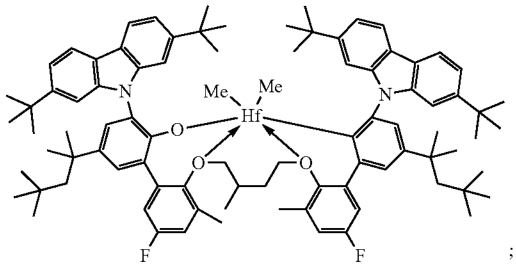

; and (v)

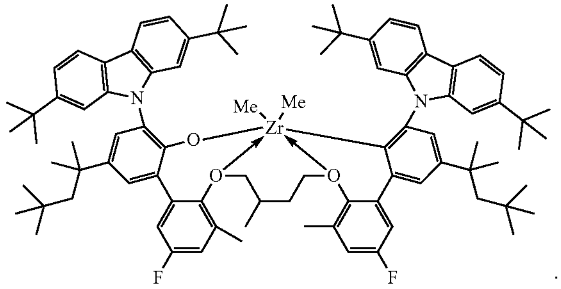

.

2. A method of making a biphenylphenol polymerization catalyst, the method comprising contacting, under activating conditions, a biphenylphenol polymerization precatalyst of at least one of structures of (iv) and (v) of claim 1 with an activator so as to activate the biphenylphenol polymerization precatalyst of structure (iv) or (v), thereby making the biphenylphenol polymerization catalyst that has a kinetic induction time of greater than 40 seconds as determined by a least squares fit of a first-order exponential for a rate of increase of an instantaneous polymerization rate.

3. A method of making a polyethylene, the method comprising:

polymerizing an olefin monomer in a polymerization reactor in presence of the biphenylphenol polymerization catalyst of claim 2 to make a polyethylene composition.

4. The method of claim 3, wherein the biphenylphenol polymerization catalyst of claim 2 is introduced into the polymerization reactor in the form of:

a slurry including the biphenylphenol polymerization catalyst; or a spray-dried catalyst composition including the biphenylphenol polymerization catalyst.

* * * * *